(12) United States Patent
Zhang et al.

(10) Patent No.: US 12,064,992 B2
(45) Date of Patent: Aug. 20, 2024

(54) TRANSPORT CART AND TRANSMISSION DEVICE THEREOF

(71) Applicant: BEIJING JINGDONG QIANSHI TECHNOLOGY CO., LTD., Beijing (CN)

(72) Inventors: Jian Zhang, Beijing (CN); Jintao Xiong, Beijing (CN); Cheng Wang, Beijing (CN); Jingren Tang, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 574 days.

(21) Appl. No.: 17/310,232

(22) PCT Filed: Jan. 3, 2020

(86) PCT No.: PCT/CN2020/070177
§ 371 (c)(1),
(2) Date: Jul. 27, 2021

(87) PCT Pub. No.: WO2020/156025
PCT Pub. Date: Aug. 6, 2020

(65) Prior Publication Data
US 2022/0126626 A1     Apr. 28, 2022

(30) Foreign Application Priority Data
Feb. 3, 2019  (CN) .......................... 201910108713.2

(51) Int. Cl.
*B60B 17/00*     (2006.01)
*B65G 1/04*      (2006.01)

(52) U.S. Cl.
CPC ...... *B60B 17/0079* (2013.01); *B60B 17/0082* (2013.01); *B65G 1/0492* (2013.01); *B60B 2200/43* (2013.01)

(58) Field of Classification Search
CPC ............... B65G 1/0492; B60K 17/043; B60B 17/0082; B60B 2200/43
See application file for complete search history.

(56) References Cited

U.S. PATENT DOCUMENTS 4,850,786 A * 7/1989 Oswald ................. B60P 1/6445
                                                        294/81.2
6,325,586 B1 * 12/2001 Loy ...................... B65G 1/1375
                                                        414/281
(Continued)

FOREIGN PATENT DOCUMENTS

CN    107635891 A    1/2018
CN    107826580 A    3/2018
(Continued)

OTHER PUBLICATIONS

Extended European Search Report dated Nov. 17, 2022 for European Application No. 20748077.3.
(Continued)

*Primary Examiner* — Michael A Riegelman
(74) *Attorney, Agent, or Firm* — Qinghong Xu

(57) ABSTRACT

A transport cart (3) and a transmission device thereof (32). The transmission device comprises: a crawling assembly (320), a rotary drive assembly and a crawling drive assembly. The crawling assembly comprises: a wheel frame (321), comprising a first end and a second end opposite to the first end, the wheel frame extending from the first end to the second end; a driving wheel (322), mounted at the second end and having an axis perpendicular to the extending direction of the wheel frame; and a guide wheel (323), mounted at the second end and having an axis parallel to the (Continued)

extending direction of the wheel frame. The present transport cart provided with the described transmission device may move along both a horizontal rail and a vertical rail and may quickly switch between the horizontal rail and the vertical rail, thus improving the moving efficiency.

20 Claims, 14 Drawing Sheets

(56) References Cited

U.S. PATENT DOCUMENTS

| | | | | |
|---|---|---|---|---|
| 6,491,127 | B1* | 12/2002 | Holmberg | B62D 7/026 |
| | | | | 301/6.5 |
| 8,418,625 | B2* | 4/2013 | Czaloun | B61B 13/127 |
| | | | | 104/173.1 |
| 11,807,456 | B2* | 11/2023 | York | B07C 5/36 |
| 11,926,476 | B2* | 3/2024 | Zhang | B60K 17/043 |
| 2005/0238467 | A1* | 10/2005 | Minges | B65G 1/04 |
| | | | | 414/462 |
| 2014/0079515 | A1* | 3/2014 | Razumov | B65G 1/0492 |
| | | | | 414/284 |
| 2014/0257555 | A1* | 9/2014 | Bastian, II | B65G 1/0492 |
| | | | | 104/287 |
| 2016/0229630 | A1* | 8/2016 | Gebhardt | B65G 1/0492 |
| 2016/0264156 | A1* | 9/2016 | Yanobu | B61B 13/04 |
| 2016/0311616 | A1* | 10/2016 | Lindblom | B65G 1/065 |
| 2020/0031577 | A1* | 1/2020 | Goren | B65G 1/0492 |
| 2021/0009349 | A1* | 1/2021 | Cohen | B65G 1/0492 |
| 2021/0221412 | A1* | 7/2021 | Zhou | B62D 1/265 |
| 2021/0237781 | A1* | 8/2021 | Hu | B60B 17/0082 |
| 2021/0237971 | A1* | 8/2021 | Zhang | B65G 1/0492 |
| 2022/0089370 | A1* | 3/2022 | Zhang | B60B 17/0082 |
| 2022/0126626 | A1* | 4/2022 | Zhang | B60K 1/00 |
| 2022/0212868 | A1* | 7/2022 | Liu | B65G 1/0464 |
| 2023/0286762 | A1* | 9/2023 | Bangalore Srinivas | B65G 1/06 |

FOREIGN PATENT DOCUMENTS

| | | | |
|---|---|---|---|
| CN | 207174610 U | 4/2018 | |
| CN | 108033184 A | 5/2018 | |
| CN | 108290685 A | 7/2018 | |
| CN | 108584259 A | 9/2018 | |
| CN | 108584271 A | 9/2018 | |
| CN | 108706265 A | 10/2018 | |
| CN | 108706266 A | 10/2018 | |
| CN | 109131637 A | 1/2019 | |
| CN | 109264284 A | 1/2019 | |
| CN | 209720654 U | 12/2019 | |
| CN | 209720656 U | 12/2019 | |
| CN | 209853078 U | 12/2019 | |
| JP | 2987020 B2 | 12/1999 | |
| TW | I639541 B | 11/2018 | |
| WO | 2005077789 A1 | 8/2005 | |
| WO | 2016199033 A1 | 12/2016 | |
| WO | 2018154574 A1 | 8/2018 | |
| WO | WO-2018154574 A1 * | 8/2018 | B25J 9/1035 |

OTHER PUBLICATIONS

Notice of Reasons for Refusal dated Jul. 26, 2022 of Japan Application No. 2021-540577.
International Search Report dated Mar. 26, 2020 for PCT international application No. PCT/CN2020/070177.
The First Office Action dated Apr. 7, 2022 of Chinese Patent No. 201910108713.2.

* cited by examiner

TRANSPORT CART AND TRANSMISSION DEVICE THEREOF

CROSS-REFERENCE TO RELEVANT APPLICATION

The present application is a 35 U.S.C. 371 national phase application of PCT International Application No. PCT/CN2020/070177 filed on Jan. 3, 2020, which claims the priority to the Chinese Patent Application No. 201910108713.2, entitled "TRANSPORT CART AND TRANSMISSION DEVICE THEREOF", filed on Feb. 3, 2019, the entire contents of both are hereby incorporated by reference.

TECHNICAL FIELD

The present disclosure generally relates to transport cart technologies, and in particular to a transport cart and a transmission device thereof.

BACKGROUND

With the development of society, people's demand for production and living materials has greatly increased, and the number and frequency of commodity exchange and circulation have increased rapidly, which has promoted the development of an express logistics industry. As an important transportation device, a shuttle car reciprocates on shuttle shelves of a three-dimensional warehouse, and realize in and out of the warehouse for a container, thereby greatly improving the efficiency of picking. The shuttle is widely used in various industries such as food and medicine, baggage handling, postal express and industrial logistics.

The shuttle shelf is usually arranged in a multi-layer shelf structure, and at least one horizontal shuttle rail is provided on each layer of shelves. The shuttle runs on the horizontal shuttle rail. A hoist is placed next to the shuttle rail. When the shuttle needs to enter an upper or lower shuttle rail from the current shuttle rail, it is necessary to move first a platform of the hoist next to the current shuttle rail, and then the shuttle enters the platform of the hoist. After that, the hoist raises or lowers the platform, so that the platform reaches the shuttle rail of a destination floor, and finally the shuttle enters the shuttle rail of the destination floor.

When the demand for outbound and inbound orders is large, if all shuttles can only reciprocate along the horizontal shuttle rail, and the hoist is required for switching when between shuttle rails, the shuttle congestion will be inevitably caused.

It should be noted that the information disclosed in the Background section above is only for enhancing the understanding of the background of the present disclosure, and thus may include information that does not constitute prior art known to those of ordinary skill in the art.

SUMMARY

A series of simplified concepts are introduced in the SUMMARY section, which will be explained in further detail in DETAILED DESCRIPTION section. Content of the disclosure is not meant to limit key features and essential technical features of the claimed technical solution, nor does it mean to determine the protection scope of the claimed technical solution.

The present disclosure provides a transmission device for a transport cart, which includes: a crawling assembly, a rotary drive assembly, and a crawling drive assembly.

The crawling assembly includes:
a wheel frame, including a first end and a second end opposite to the first end, the wheel frame extending from the first end to the second end;
a driving wheel, mounted at the second end and having an axis perpendicular to an extending direction of the wheel frame; and
a guide wheel, mounted at the second end and having an axis parallel to the extending direction of the wheel frame;
wherein, the rotary drive assembly is configured to drive the wheel frame to rotate around a central axis of the extending direction of the wheel frame; and the crawling drive assembly is configured to drive the driving wheel to roll.

According to an embodiment of the present disclosure, four crawling assemblies are provided, and the transmission device further includes a telescopic drive assembly.

The telescopic drive assembly includes:
a first sliding rail parallel to the central axis, the first sliding rail being slidably connected with two of the four crawling assemblies;
a second sliding rail parallel to the first sliding rail and separated from the first sliding rail, the second sliding rail being slidably connected with the other two of the four crawling assemblies; and
a linear actuator, configured to drive each crawling assembly to slide along a respective sliding rail where it is located;
wherein, the first ends of the wheel frames of two crawling assemblies located on a same sliding rail are arranged opposite to each other.

According to an embodiment of the present disclosure, the crawling assembly further includes:
a mounting seat slidably connected with the sliding rails;
a rotary cylinder rotationally connected with the mounting seat, the rotary cylinder is rotatable around its axis;
a transmission mechanism, arranged within the wheel frame and being in transmission connection with the driving wheel;
an input shaft, penetrating through the rotary cylinder, extending into the wheel frame from the first end and being in transmission connection with the transmission mechanism, wherein axes of the input shaft and the rotary cylinder both coincide with the central axis;
the crawling drive assembly drives the driving wheel to roll by driving the input shaft to rotate, and the rotary drive assembly drives the wheel frame to rotate by driving the rotary cylinder to rotate.

According to an embodiment of the present disclosure, the input shafts of two crawling assemblies located on the first sliding rail are arranged coaxially, and the input shafts of two crawling assemblies located on the second sliding rail are arranged coaxially;
the crawling drive assembly includes two connection shafts parallel to the input shafts and close to the first sliding rail and the second sliding rail respectively, and a first motor for driving the two connection shafts to rotate;
wherein, two ends of each connection shaft are respectively splined to a set of two input shafts arranged coaxially, and the connection shaft and the input shaft are slideable axially with respect to each other.

According to an embodiment of the present disclosure, the first motor is in belt transmission, chain transmission, or gear transmission with the two connection shafts, respectively.

According to an embodiment of the present disclosure, the rotary drive assembly includes a transmission shaft parallel to the connection shaft and rotatable about its own axis, and a second motor for driving the transmission shaft to rotate;

two ends of the transmission shaft are in transmission connection with the rotary cylinders of two crawling assemblies located on the first sliding rail, respectively, and every two rotary cylinders located on a same side are in transmission connection.

According to an embodiment of the present disclosure, the rotary cylinders are in belt transmission or chain transmission, the transmission shaft is in belt transmission, chain transmission, or gear transmission with the rotary cylinders, and a main shaft of the second motor is in belt transmission, chain transmission, or gear transmission with the transmission shaft.

According to an embodiment of the present disclosure, the connection shaft is splined with the input shaft, the input shaft is capable of sliding axially relative to the connection shaft, and one of the connection shaft and the input shaft is a spline shaft, while the other is a spline tube;

the transmission shaft includes a first sub-shaft parallel to the input shaft and rotatable around its own axis, and two second sub-shafts arranged at two ends of the first sub-shaft and coaxially arranged with the first sub-shaft, respectively, the first sub-shaft is splined with the second sub-shafts, the second sub-shafts are capable of sliding axially relative to the first sub-shaft, and one of the first sub-shaft and the second sub-shaft is the spline shaft, while the other is the spline tube;

the two second sub-shafts are in transmission connection with the rotary cylinders of the two crawling assemblies located the first sliding rail, respectively, the telescopic drive assembly further includes two support seats, and the two support seats are fixedly connected with the mounting seats of the two crawling assemblies located on the first sliding rail, respectively, and the two support seats are also rotationally connected with the two second sub-shafts, respectively.

According to an embodiment of the present disclosure, the linear actuator includes:

two screw rods parallel to the central axis and rotatable around their own axis, wherein two ends of each screw rod are provided with two external thread segments with opposite rotation directions;

four screw nuts sleeved on the four external thread segments, respectively; and a third motor for driving the two screw rods to rotate;

wherein, the two screw rods are arranged close to the first sliding rail and the second sliding rail, respectively, and the four screw nuts are fixedly connected with four mounting seats, respectively.

According to an embodiment of the present disclosure, a main shaft of the third motor are in belt transmission, chain transmission, or gear transmission with the two screw rods, respectively.

According to an embodiment of the present disclosure, the transmission device further includes a first base and a second base, both of which are configured to be fixedly connected with a cart body of the transport cart;

the first base and the second base are close to the first sliding rail and the second sliding rail, respectively;

the first base is rotationally connected with the connection shaft, the screw rod, and the first sub-shaft that are close to the first sliding rail, and the second base is rotationally connected with the connection shaft and the screw rod that are close to the second sliding rail.

According to an embodiment of the present disclosure, two first bases and two second bases are provided, the two first bases are separated from each other, and the two second bases are separated from each other.

According to an embodiment of the present disclosure, the driving wheel is provided with a first rotating shaft, and the first rotating shaft is rotationally connected with the wheel frame;

the transmission mechanism includes:

a first bevel gear sleeved on the input shaft;

a second rotating shaft being rotationally connected with the wheel frame and parallel to the first rotating shaft;

a second bevel gear sleeved on the second rotating shaft and engaging with the first bevel gear;

wherein, the second rotating shaft is in transmission connection with the first rotating shaft.

According to an embodiment of the present disclosure, the transmission mechanism further includes a first cylindrical gear sleeved on the first rotating shaft;

a second cylindrical gear sleeved on the second rotating shaft;

a spindle mounted on the wheel frame and parallel to the first rotating shaft; and a third cylindrical gear sleeved on the spindle and capable of rotating around the spindle, wherein the third cylindrical gear engages with the first cylindrical gear and the second cylindrical gear, respectively.

According to an embodiment of the present disclosure, a middle part of the second rotating shaft is rotationally connected with the wheel frame, the second bevel gear and the second cylindrical gear are arranged at two ends of the second rotating shaft, respectively, and the first bevel gear is located between the second bevel gear and the second cylindrical gear.

According to an embodiment of the present disclosure, the crawling assembly further includes a bearing, an outer ring of the bearing abuts against an inner wall of the rotary cylinder, and an inner ring of the bearing is sleeved on the input shaft.

According to an embodiment of the present disclosure, the central axis passes through a center of the driving wheel, two guide wheels are provided, and the two guide wheels are arranged on opposite sides of the driving wheel respectively, and have equal distances from the central axis.

According to an embodiment of the present disclosure, the telescopic drive assembly further includes two first sliding blocks, both of which are arranged on the first sliding rail; and two second sliding blocks, both of which are arranged on the second sliding rail;

wherein, the four mounting seats are arranged on the two first sliding blocks and the two second sliding blocks, respectively.

According to an embodiment of the present disclosure, the driving wheel is a flat wheel, a synchronous wheel, a gear, or a sprocket.

The present disclosure also proposes a transport cart, which includes the transmission device as described above.

BRIEF DESCRIPTION OF THE DRAWINGS

By considering the following detailed description of preferred embodiments of the present disclosure in conjunction with accompanying drawings, various objectives, features, and advantages of the present disclosure will become more apparent. The accompanying drawings are merely exemplary illustrations of the present disclosure, and are not necessarily drawn to scale. In the accompanying drawings, same reference numerals always refer to the same or similar parts.

DETAILED DESCRIPTION

Figure 1:
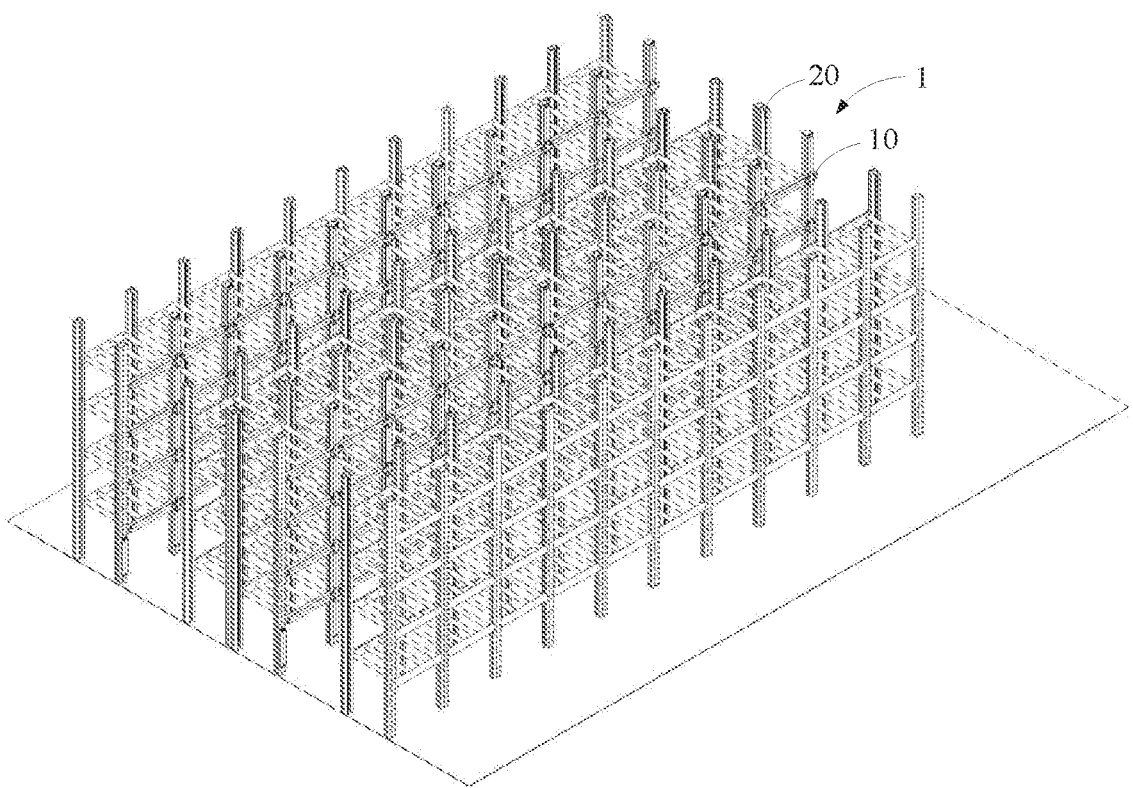
FIG. 1 is a three-dimensional schematic diagram showing a three-dimensional shelf according to an exemplary embodiment.

Example embodiments will now be described more fully with reference to the accompanying drawings. However, the embodiments may be implemented in a variety of forms and should not be construed as being limited to the examples set tenth herein. Instead, these embodiments are provided so that the present disclosure will be more complete, so as to convey the idea of the exemplary embodiments to those skilled in the art. The same reference numerals in the drawings denote the same or similar parts, and the repeated description thereof will be omitted.

Figure 2:
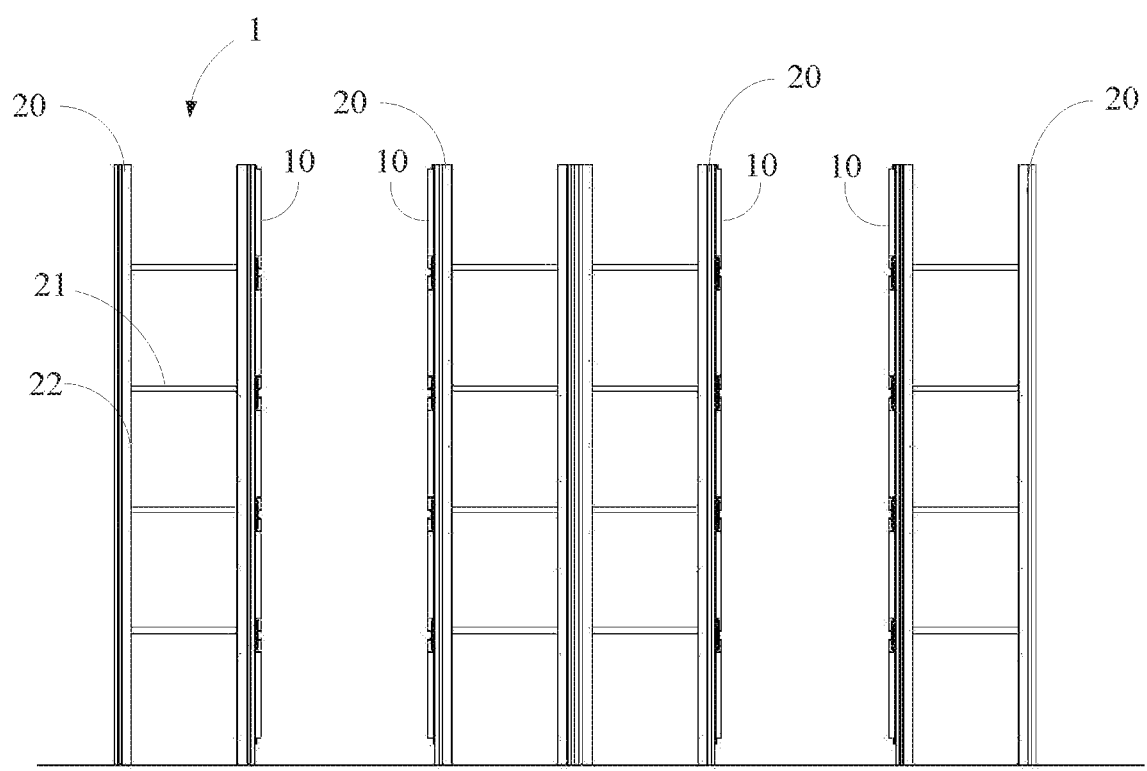
FIG. 2 is a schematic side view showing a three-dimensional shelf according to an exemplary embodiment.

FIGS. 1 and 2 show a three-dimensional shelf 1 according to an embodiment of the present disclosure. Referring to FIGS. 1 and 2, the three-dimensional shelf 1 includes a shelf body 20 and a guide rail assembly 10 arranged on a side of the shelf body 20. In a warehouse, there may be multiple three-dimensional shelves 1, which are arranged side by side, and the number of the three-dimensional shelves 1 may be four. As shown in FIG. 2, every two adjacent three-dimensional shelves 1 form a group, and the two three-dimensional shelves 1 in the same group are separated from each other, so as to form an aisle with a uniform width between the two three-dimensional shelves 1. The guide rail assembly 10 on the three-dimensional shelf 1 is arranged on a side of the three-dimensional shelf 1 close to the aisle, so that two guide rail assemblies 10 are arranged at two sides of the aisle, respectively. Crawling assemblies 320 on both sides of a transport cart 3 can cooperate with the two guide rail assemblies 10, respectively, and move along the guide rail assemblies 10, so as to realize traveling of the transport cart 3 in the aisle.

Figure 3:
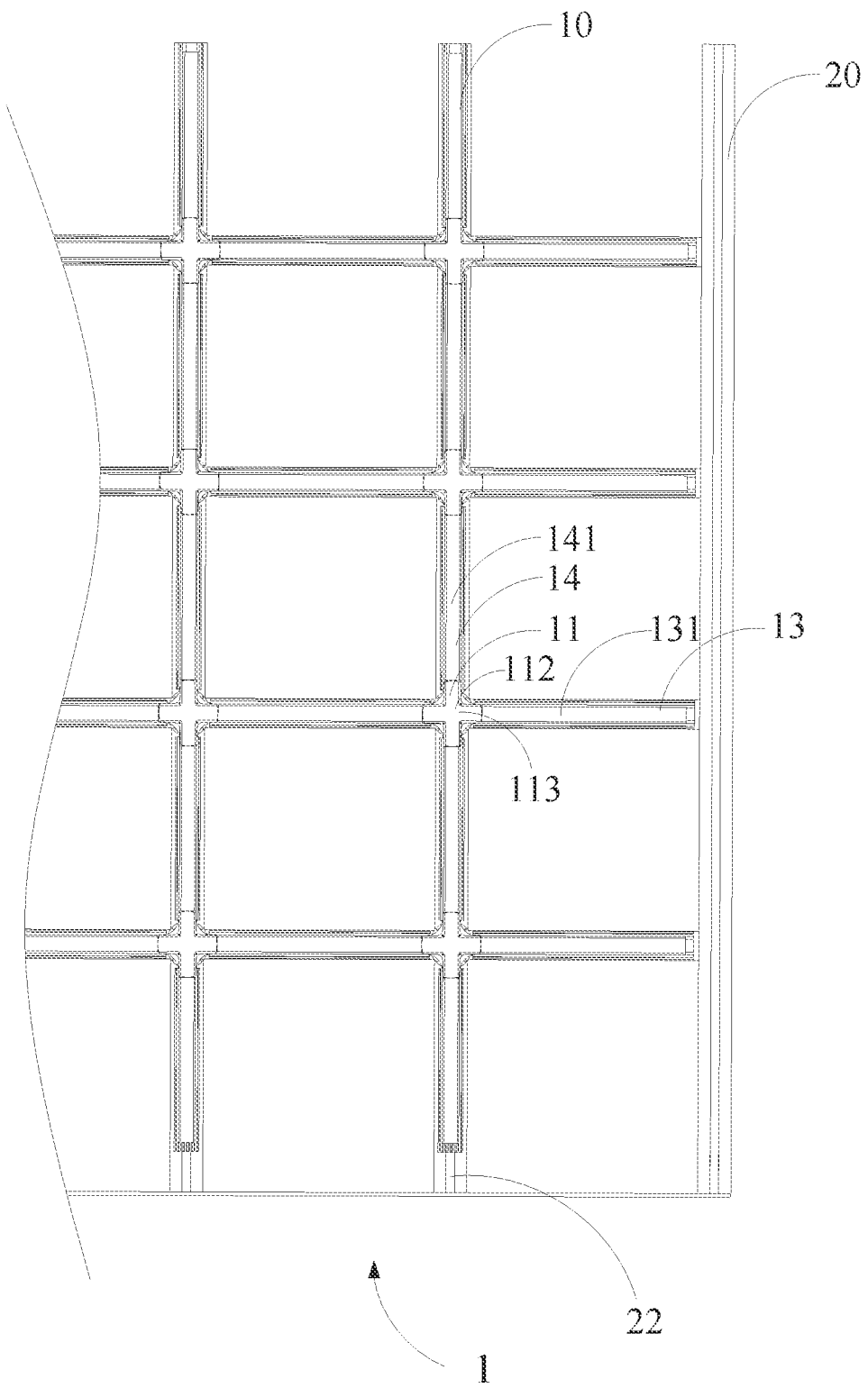
FIG. 3 is a partial front view showing a three-dimensional shelf according to an exemplary embodiment.

Referring to FIG. 3, the guide rail assembly 10 includes a steering guide rail 11, a first rail 13 and a second rail 14. The steering guide rail 11, the first rail 13, and the second rail 14 are all mounted on the shelf body 20. The first rail 13, the second rail 14, and the steering guide rail are all arranged in a same plane, which is preferably a vertical plane. The first rail 13 extends along a horizontal straight line, and the second rail 14 extends in a vertical direction. The first rail 13 and the second rail 14 intersect perpendicularly. The steering guide rail 11 is mounted at the intersection of the first rail 13 and the second rail 14. Each of the first rail 13 and the second rail 14 is divided into multiple segments by the steering guide rail 11.

Figure 4:
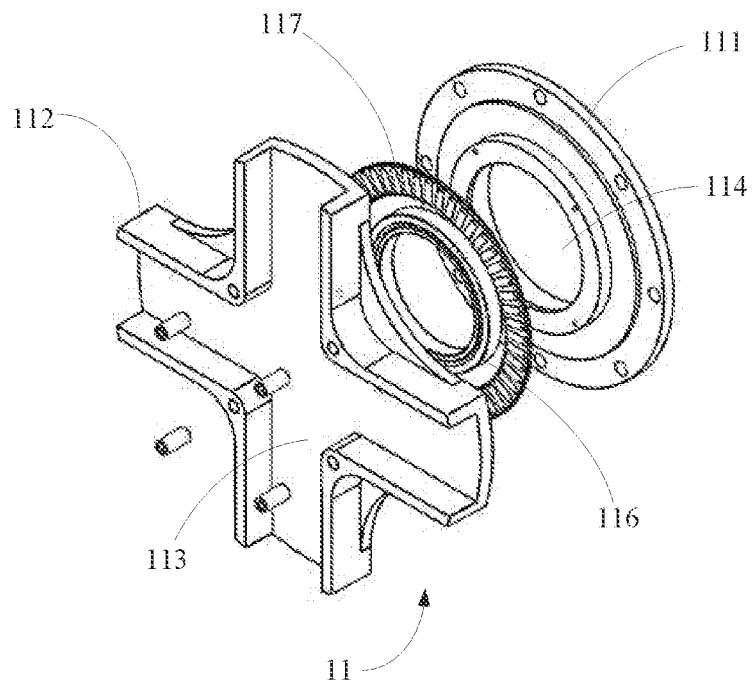
FIG. 4 is a schematic exploded diagram showing a steering guide rail according to an exemplary embodiment.
Figure 5:
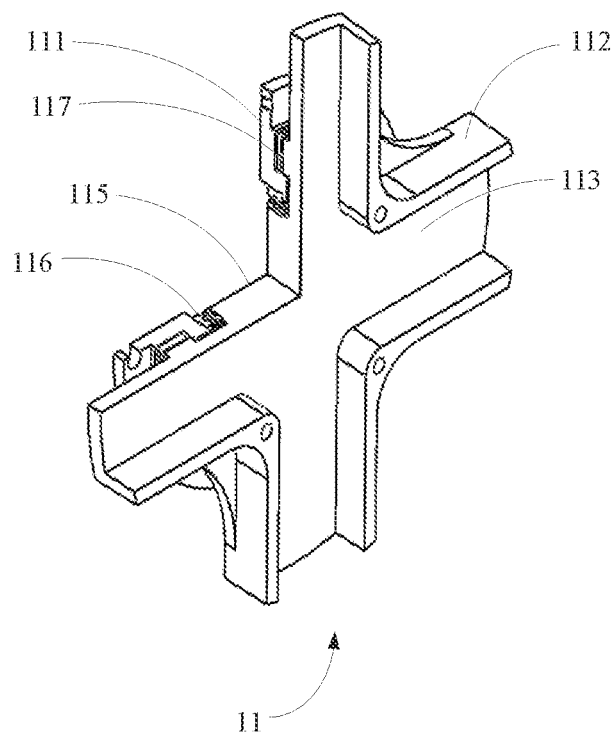
FIG. 5 is a partial cross-sectional view showing a steering guide rail according to an exemplary embodiment.

Referring to FIGS. 4-5, the steering guide rail 11 includes a mounting base 111 and a rotatory part 112. The mounting base 111 is mounted on a vertical column 22. The rotatory part 112 is mounted on the mounting base 111 and is located on a side of the mounting base 111 away from the shelf body 20. The rotatory part 112 is rotationally connected with the mounting base 111, and the rotatory part 112 is capable of rotating relative to the mounting base 111. The rotatory part 112 rotates around a central axis perpendicular to a bottom face of a guide-rail groove 113. The central axis is a straight line passing through a center of the guide-rail groove 113 and perpendicular to the bottom face of the guide-rail groove 113. The rotatory part 112 includes the guide-rail groove 113, which is located on a side of the rotatory part 112 away from the shelf body 20. The guide-rail groove 113 includes two straight grooves. Lengths of the two straight grooves are equal. The two straight grooves intersect perpendicularly, and the intersection is their midpoint, which is the center of each guide-rail groove 113. The two straight grooves are both perpendicular to a rotation axis of the rotatory part 112, and the rotation axis passes through the center of each guide-rail groove 113. The guide-rail groove 113 may be a cross shape or an asterisk shape. Two ends of the straight groove extend to edges of opposite sides of the rotatory part 112, respectively.

In an embodiment, a mounting hole 114 is provided on the mounting base 111, and the mounting hole 114 is a round hole. The mounting hole 114 is provided in the middle part of the mounting base 111, and the mounting hole 114 may be a through hole. The rotatory part 112 is provided with a rotating shaft 115. The rotating shaft 115 is arranged on a side of the rotatory part 112 close to the mounting base 111, and extends into the mounting hole 114. A diameter of the rotating shaft 115 is smaller than that of the mounting hole 114, and an axis of the rotating shaft 115 is coaxial with an axis of the mounting hole 114.

The steering guide rail 11 also includes a stewing bearing 116. The stewing bearing 116 includes an inner ring, an outer ring, and a roller arranged between the inner ring and the outer ring. The stewing bearing 116 is preferably a ball bearing. The inner ring of the stewing bearing 116 is sleeved on the rotating shaft 115, and the inner ring preferably has an interference fit with the rotating shaft 115. An outer circumferential wall of the outer ring of the stewing bearing 116 abuts against an inner circumferential wall of the mounting hole 114, and there is an interference fit between the outer ring of the slewing bearing 116 and the mounting hole 114.

In this way, the mounting base 111 and the rotatory part 112 may be rotationally connected together through the slewing bearing 116, and the mounting base 111 and the rotatory part 112 are rotationally matched precisely.

The steering guide rail 11 also includes a thrust bearing 117, which may be one of a thrust cylindrical roller bearing, a thrust tapered roller bearing, and a thrust ball bearing. The thrust bearing 117 is sandwiched between the mounting base 111 and the rotatory part 112, and are arranged coaxially with the stewing bearing 116.

In this way, the thrust bearing 117 can carry the largest portion of an axial load, and the slewing bearing 116 has a longer service life. In addition, the fit between the mounting base 111 and the rotatory part 112 is also tighter, and it is not easy to move relatively.

Figure 6:
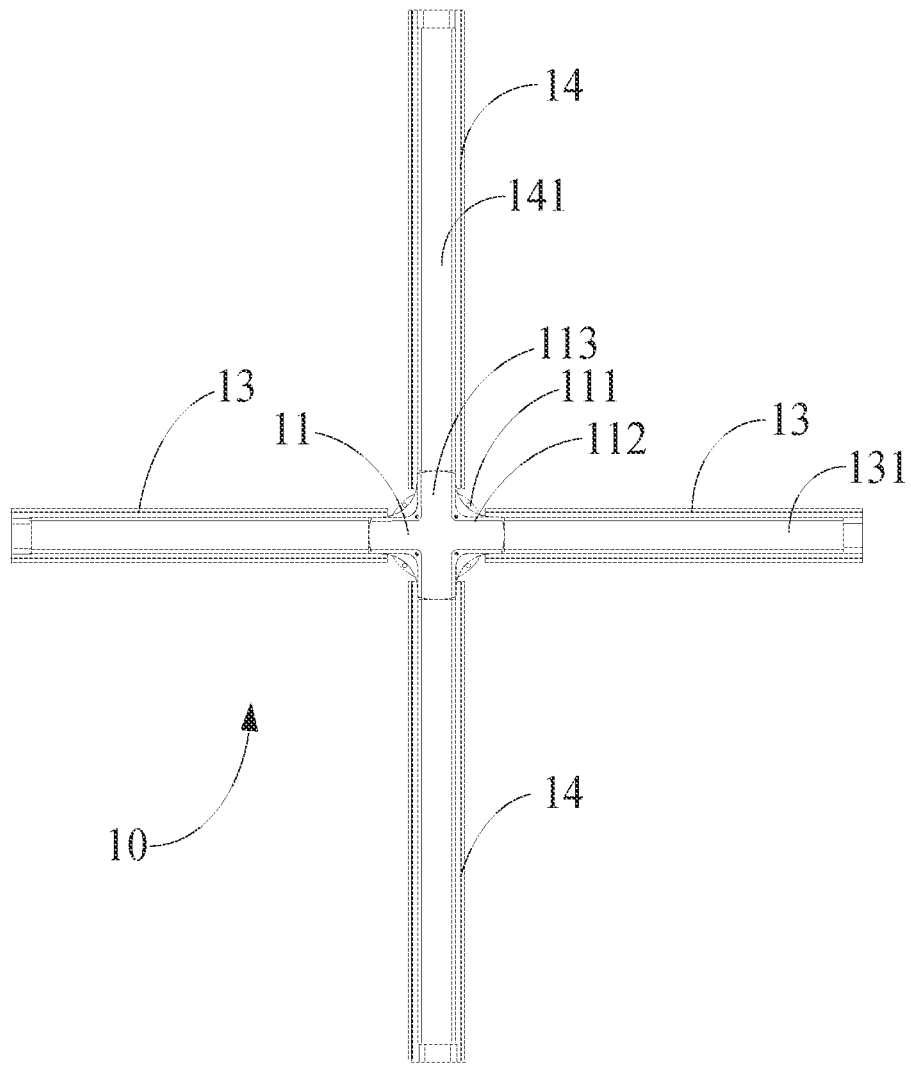
FIG. 6 is a partial front view showing a guide rail assembly according to an exemplary embodiment.

Referring to FIG. 6, the first rail 13 is a straight rail, and is provided with a first groove 131. The first groove 131 extends along the first rail 13. That is, the first groove 131 extends in the horizontal direction. The second rail 14 is a straight rail, and is provided with a second groove 141. The second groove 141 extends along the second rail 14. That is, the second groove 141 extends in the horizontal direction. One end of the first groove 131 and one end of the second groove 141 extend to the rotatory part 112. When the rotatory part 112 rotates, the rotatory part 112 can rotate to a position where the guide-rail groove 113 is connected with the first groove 131 and the second groove 141. That is, a straight groove in the guide-rail groove 113 is connected with the first groove 131, and the other straight groove is connected with the second groove 141.

Bottom walls of the first groove 131, the second groove 141 and two straight grooves of the guide-rail groove 113 may be mounted with transmission elements extending along an extending direction of the groove. The transmission element may be a synchronous belt, a rack or a chain.

There are multiple first rails 13 and second rails 14. The first rails 13 and the storage brackets 21 are arranged in a one-to-one correspondence, and each first rail 13 is arranged on an edge of the storage bracket 21 corresponding to the first rail 13. The multiple second rails 14 are arranged on multiple vertical columns 22, respectively. The second rails 14 and the vertical columns 22 on the same side of the three-dimensional shelf 1 are arranged in a one-to-one correspondence, and each second rail 14 is arranged on the vertical column 22 corresponding to the second rail 14. The multiple first rails 13 and the multiple second rails 14 are located in the same vertical plane, and the multiple first rails 13 and the multiple second rails 14 are interwoven into a rail network. There are also multiple steering guide rails, and the multiple steering guide rails are arranged at each intersection in the rail network, respectively.

Figure 7:
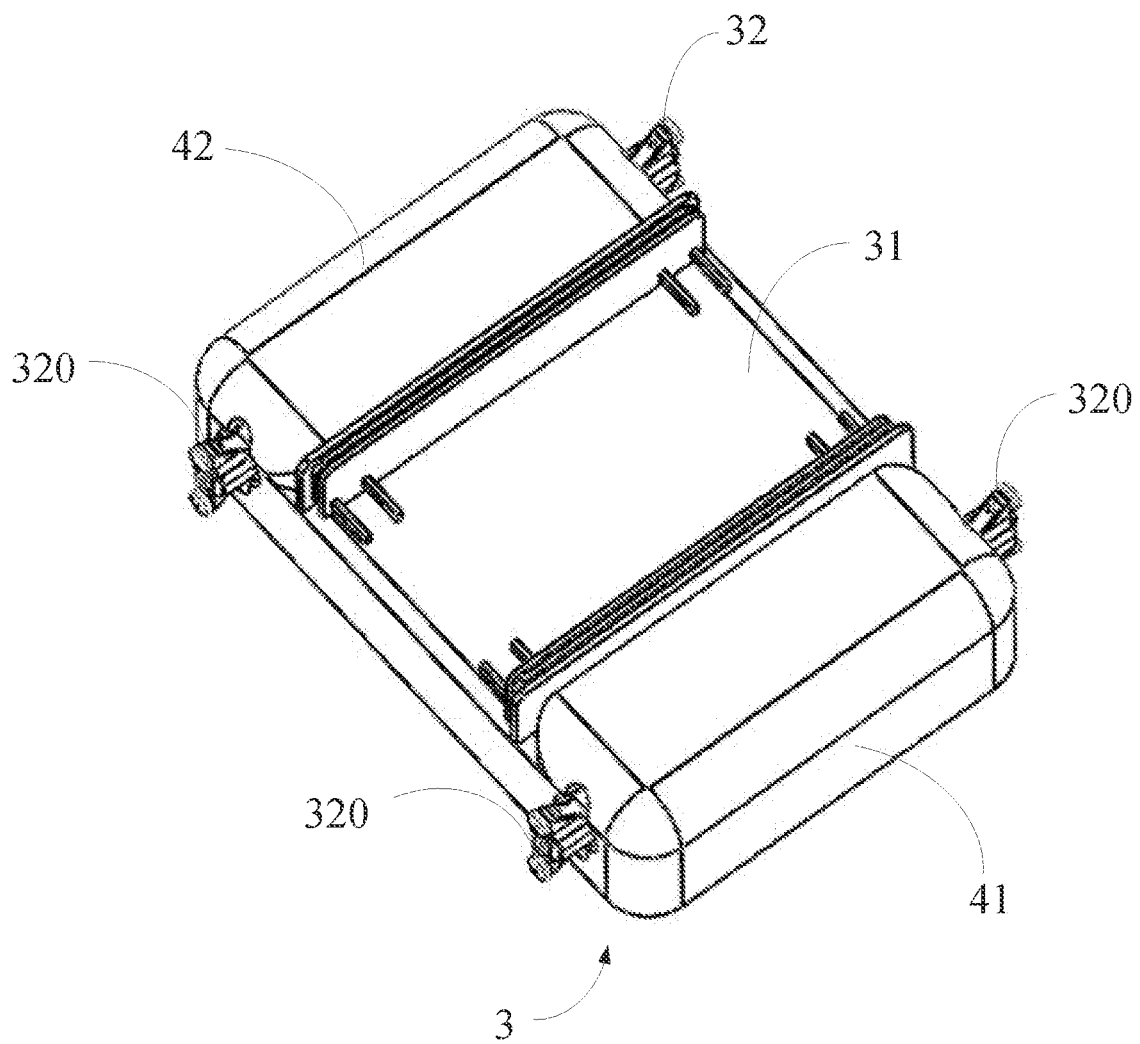
FIG. 7 is a three-dimensional schematic diagram showing a transport cart according to an exemplary embodiment.

FIG. 7 shows a transport cart 3 in an embodiment of the present disclosure. As shown in FIG. 7, such transport cart 3 is preferably an automated guided vehicle.

The transport cart 3 includes a cart body 31 and a transmission device 32. The transmission device 32 is mounted on the cart body 31. The transmission device 32 is used to drive the cart body 31 to move along the guide rail assembly 10. The cart body 31 may be provided in a substantially rectangular structure. The cart body 31 includes a front end 41 and a rear end 42 opposite to the front end 41. The front end 41 may be the front end 41 of the cart body 31, and the rear end 42 may be the rear end 42 of the cart body 31.

The transmission device 32 includes four crawling assemblies 320, a crawling drive assembly and a rotary drive assembly. The four crawling assemblies 320 are arranged on two opposite sides of the cart body 31, respectively. Both the crawling drive assembly and the rotary drive assembly are arranged inside the cart body 31. The transport cart 3 is located between two guide rail assemblies 10 when crawling along the rail, and the crawling assemblies 320 on both sides of the transport cart 3 abut against the guide rail assemblies 10 on both sides, respectively, so as to support the transport cart 3.

In embodiments, two crawling assemblies 320 are arranged on opposite sides of the front end 41 of the cart body 31, respectively, and the other two crawling assemblies 320 are arranged on opposite sides of the rear end 42 of the cart body 31, respectively. The four crawling assemblies 320 support the cart body 31 at positions close to four corners of the cart body 31, which is more stable and reliable.

Figure 8:
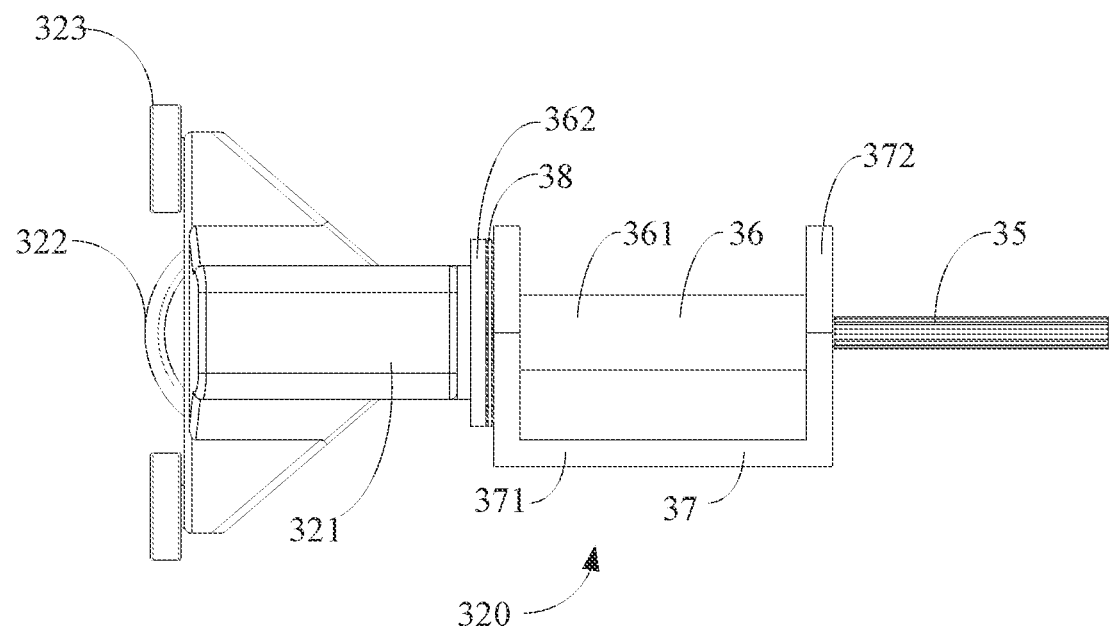
FIG. 8 is a schematic front view showing a crawling assembly according to an exemplary embodiment.
Figure 9:
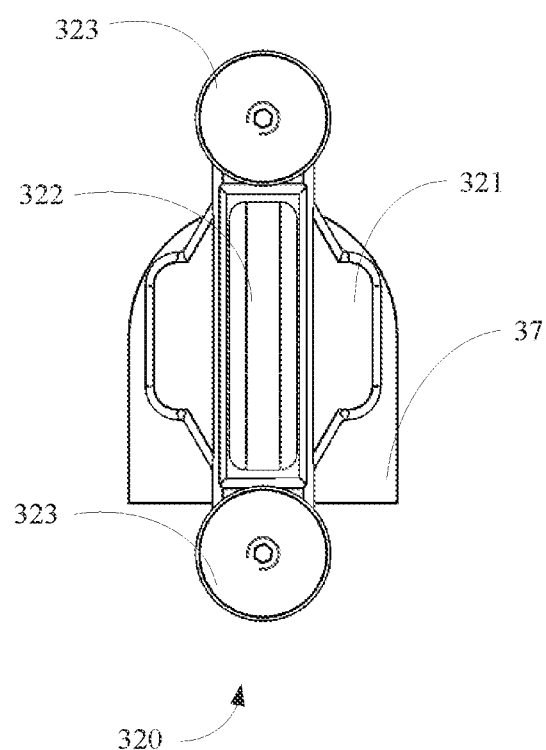
FIG. 9 is a schematic left view showing a crawling assembly according to an exemplary embodiment.

Referring to FIGS. 8 and 9, each crawling assembly 320 includes a wheel frame 321, a driving wheel 322 and a guide wheel 323. The wheel frame 321 is configured in a substantially straight shape, and the wheel frame 321 extends from a side of the cart body 31 in a direction away from the cart body 31. The wheel frame 321 includes a first end and a second end opposite to the first end, and the wheel frame 321 extends from the first end to the second end. The first end of the wheel frame 321 faces the cart body 31, and the second end of the wheel frame 321 faces away from the cart body 31. The second end of the wheel frame 321 can protrude outward from the side of the cart body 31. The driving wheel 322 and the guide wheel 323 are both mounted on the second end of the wheel frame 321. The driving wheel 322 may be in a form of a flat wheel, a pulley, a gear, a sprocket, and the like. An axis of the driving wheel 322 is perpendicular to an extending direction of the wheel frame 321. The guide wheel 323 is arranged on a side of the driving wheel 322, and an axis of the guide wheel 323 is parallel to the extending direction of the wheel frame 321. The axis of the guide wheel 323 lies in a plane that passes through a center of the driving wheel 322 and is perpendicular to the axis of the driving wheel 322, so that an outer peripheral surface of the driving wheel 322 faces the guide wheel 323, and the guide wheel 323 is always in a travelling direction of the driving wheel 322.

In embodiments, the wheel frame 321 is capable of rotating around a central axis of the extending direction of the wheel frame 321, and the central axis is perpendicular to an axis of the driving wheel 322. The central axis preferably passes through a center of the driving wheel 322. Since the wheel frame 321 is capable of rotating around its central axis, the traveling direction of the driving wheel 322 may be changed by rotating the wheel frame 321. The rotary drive assembly is used to drive the wheel frame 321 to rotate, and the crawling drive assembly is used to drive the driving wheel 322 to roll.

Widths of the first groove 131, the second groove 141 and the guide-rail groove 113 are all greater than a diameter of the guide wheel 323, and the guide wheel 323 can extend into the first groove 131, the second groove 141 and the guide-rail groove 113. When the transport cart 3 moves horizontally along the first groove 131, since the diameter of the guide wheel 323 is larger than the width of the driving wheel 322, the guide wheel 323 is hung on a side wall of the first groove 131 and carries the cart body 31. When the driving wheel 322 moves vertically along the second groove 141, the driving wheel 322 carries the cart body 31, and the guide wheel 323 interacts with a side wall of the second groove 141 to guide the driving wheel 322 to move along the first groove 131.

Figure 10:
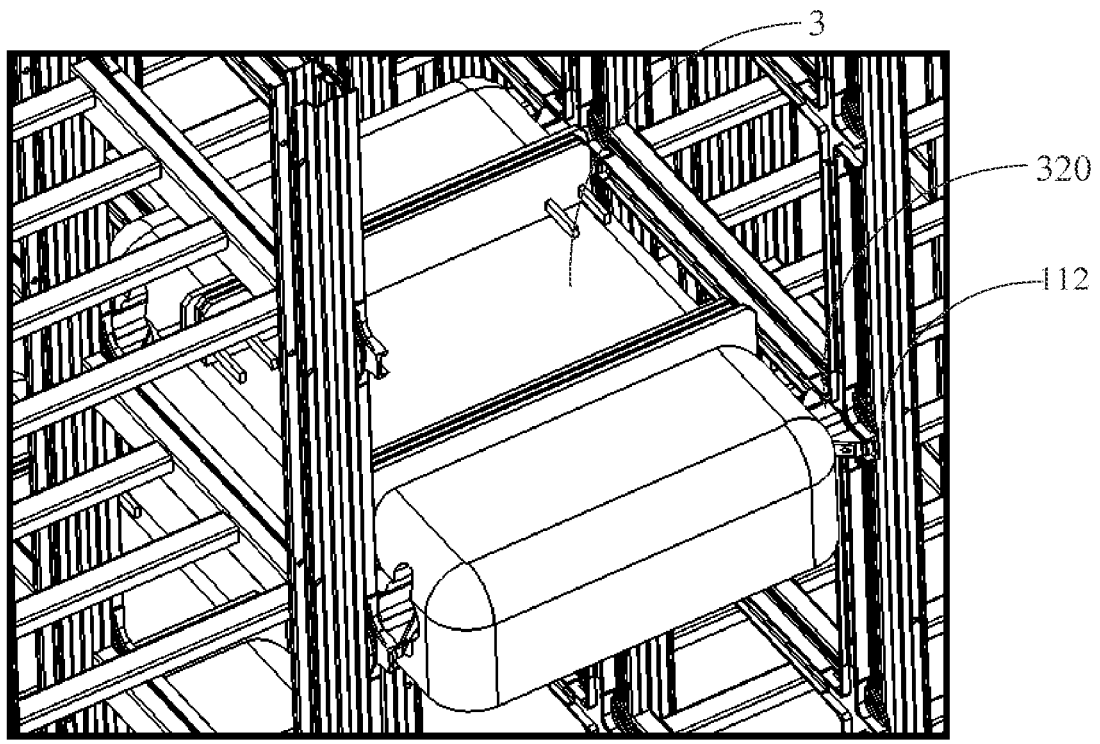
FIG. 10 is a schematic diagram showing a transport cart traveling on a three-dimensional shelf according to an exemplary embodiment.
Figure 11:
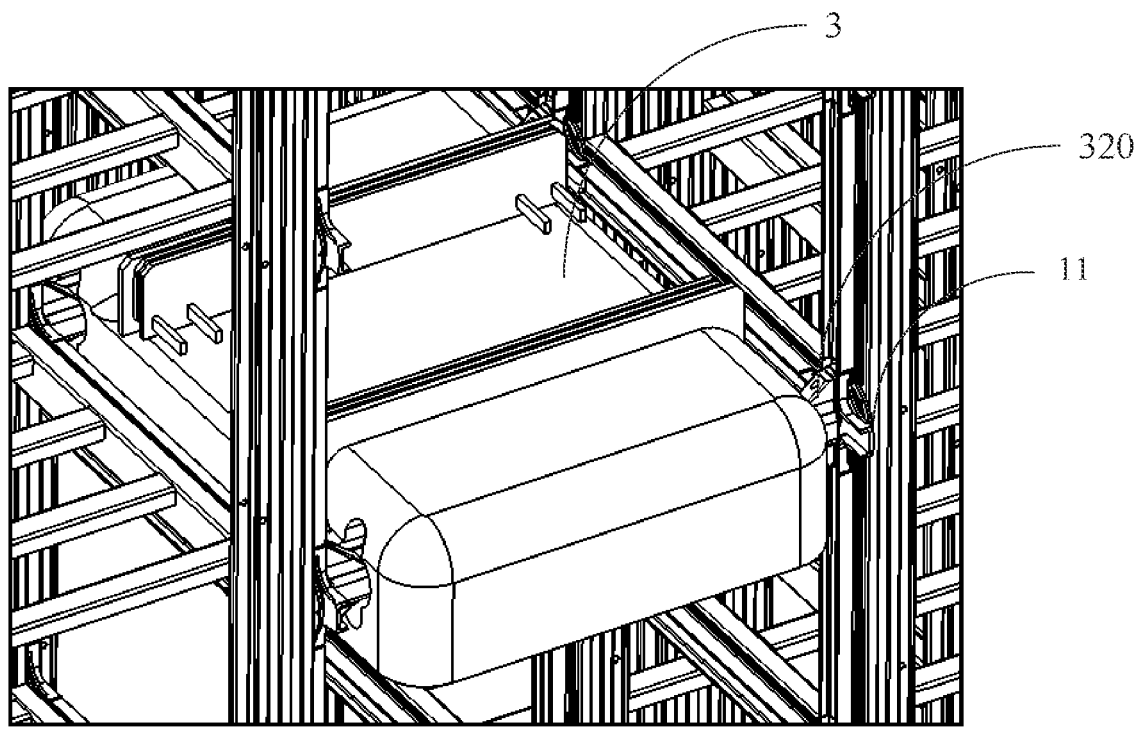
FIG. 11 is a schematic diagram showing a transport cart traveling on a three-dimensional shelf according to an exemplary embodiment.

When the transport cart 3 needs to travel from the first rail 13 to the second rail 14, the rotary part 112 is rotated in advance to a position where the guide-rail groove 113 is connected with the first groove 131 and the second groove 141, and the crawling drive assembly drives the driving wheel 322, so that the crawling assembly 320 enters the guide-rail groove 113 from the first groove 131. At this time, states of the crawling assembly 320 and the rotary part 112 are as shown in FIG. 10. Then the rotary drive assembly drives the wheel frame 321 to rotate by 90°, and the rotary part 112 is driven to rotate when the wheel frame 321 rotates. When the rotary part 112 rotates by 90°, the guide-rail groove 113 is connected with the first groove 131 and the second groove 141 again, respectively. At this time, the states of the crawling assembly 320 and the rotary part 112 are as shown in FIG. 11. The transport cart 3 may continue to travel toward the second groove 141, until it enters the second groove 141, thereby rendering the transport cart 3 running from the first rail 13 to the second rail 14. Similarly, the transport cart 3 may also travel from the second rail 14 to the first rail 13. In this case, the transport cart 3 can run both in the horizontal direction and the vertical direction along the guide rail assembly 10, and the transport cart 3 has a more flexible running route.

The rail network is a rectangular grid, and the smallest cell is a rectangular grid. The transport cart 3 can travel along the rail network, and the transport cart 3 can turn at each steering guide rail 11 and switch between rails arbitrarily, so that the running routes of the transport cart 3 are more diverse. When the rail in the traveling direction of the transport cart 3 is congested, the transport cart 3 can bypass the congestion by switching between rails without waiting for the rail to be cleared, which greatly improves the handling efficiency of the transport cart 3.

The driving wheel may be a flat wheel, a synchronous wheel, a gear or a sprocket. When the driving wheel 322 is the synchronous wheel, the gear or the sprocket, it can engage with corresponding transmission elements mounted in the first groove 131, the second groove 141, and the two straight grooves of the guide-rail groove 113, so as to prevent slipping.

Further, two guide wheels 323 are provided. The two guide wheels 323 are both arranged on the end of the second end of the wheel frame 321. The two guide wheels 323 are located on opposite sides of the driving wheel 322, respectively. The wheel frame 321 rotates around its central axis, wherein the central axis passes through the center of the driving wheel 322, and distances from the central axis to the axes of the two guide wheels 323 are equal.

The driving wheel 322 is arranged between the two guide wheels 323, which can completely avoid friction between the driving wheel 322 and a side wall of the groove. When the transport cart 3 moves horizontally in the first groove 131, the two guide wheels 323 are hung on the side wall of the first groove 131 and carry the cart body 31, and distances from the two guide wheels 323 to the center axis of the wheel frame 321 are equal. Deflection moments applied to the wheel frame 321 by the two guide wheels 323 cancel each other, and the force on the wheel frame 321 is more reasonable.

Figure 12:
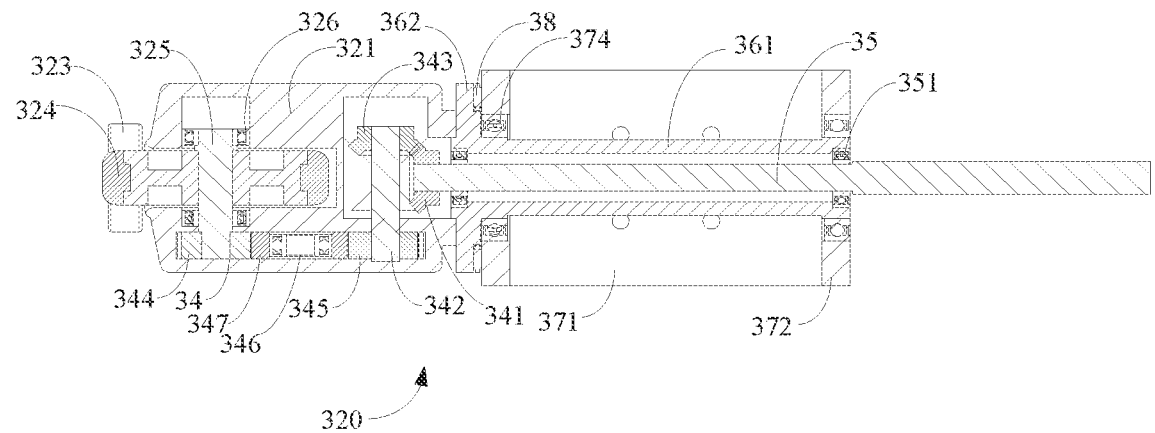
FIG. 12 is a schematic full cross-section diagram showing a crawling assembly according to an exemplary embodiment.
Figure 13:
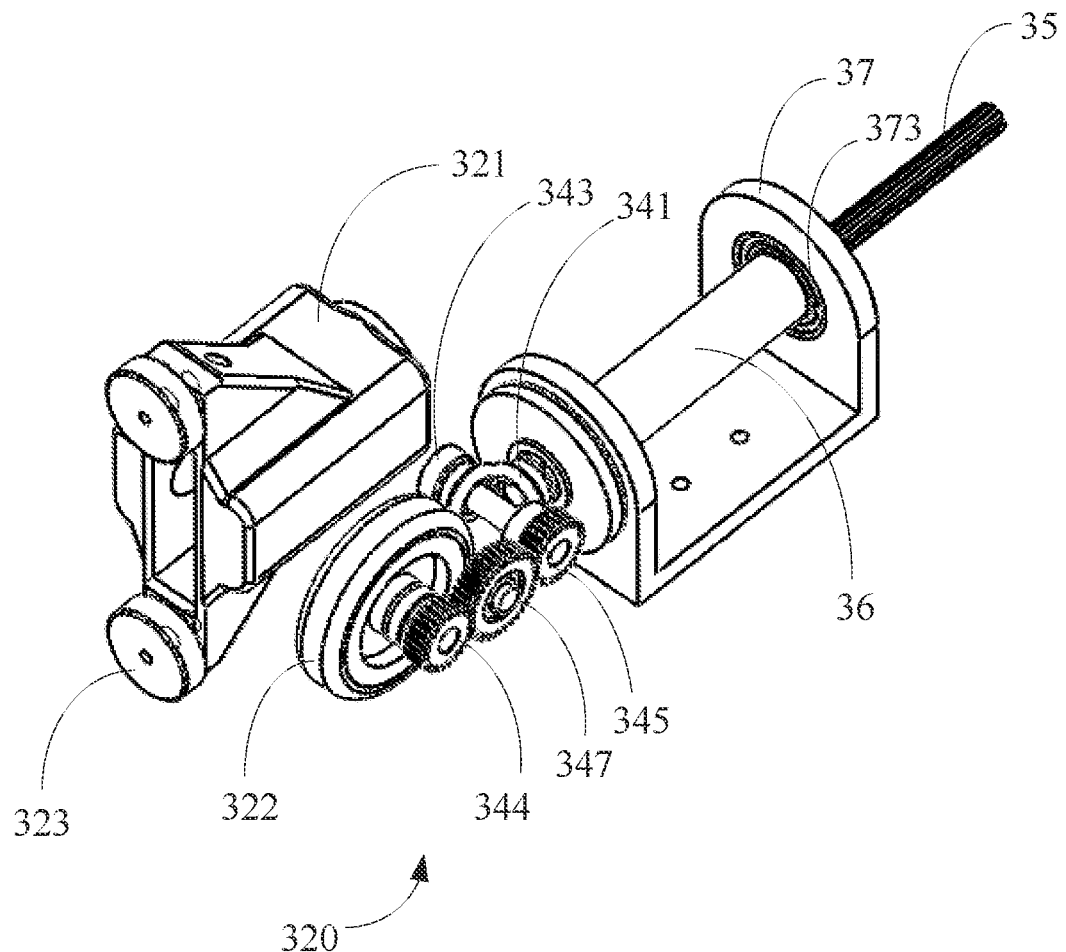
FIG. 13 is a schematic exploded diagram showing a crawling assembly according to an exemplary embodiment.

Further, referring to FIGS. 12 and 13, each crawling assembly 320 includes a transmission mechanism 34, an input shaft 35, a rotary cylinder 36 and a mounting seat 37.

The mounting seat 37 is arranged on the cart body 31. In embodiments, the mounting seat 37 includes a bottom plate 371 and two side plates 372. The two side plates 372 are located on a same side of the bottom plate, and both are perpendicular to the bottom plate 371. The two side plates 372 are parallel to each other. The two side plates 372 are both provided with mounting through holes 373, which are circular through holes. The two mounting through holes 373 are aligned with each other. That is, the two mounting through holes 373 are coaxially arranged.

The rotary cylinder 36 includes a cylinder body 361. The cylinder body 361 has a cylindrical shape, and a diameter of the cylinder body 361 is smaller than that of the mounting through hole 373. The cylinder body 361 is arranged in the mounting through hole 373. The cylinder body 361 is rotationally connected with the mounting seat 37. In embodiments, the crawling assembly 320 further includes two stewing bearings 374, and inner rings of the two slewing bearings 374 are sleeved on both ends of the cylinder body 361, respectively. The slewing bearing 374 may be a radial bearing or a deep groove ball bearing. Outer rings of the two slewing bearings 374 are mounted in the mounting through hole 373 and form a fixed connection with the mounting through hole 373. There may be an interference fit between the outer ring of the slowing bearing 374 and the mounting through hole 373. In this way, the rotary cylinder 36 is rotationally connected with the mourning seat 37 through the slewing bearing 374. It should be understood that the stewing bearing 374 may not be provided, and a clearance fit between the mounting through hole 373 and the rotary cylinder 36 may also realize the rotational connection between the rotary cylinder 36 and the mounting seat 37.

The first end of the wheel frame 321 is fixedly connected with an end of the rotary cylinder 36. An end of the first end of the wheel frame 321 and an end of the rotary cylinder 36 may be welded, screwed or bolted to each other. In this way, the wheel frame 321 is mounted onto the rotary cylinder 36, and the rotary cylinder 36 can drive the wheel frame 321 to rotate around an axis of the rotary cylinder 36. In this case, the center axis of the wheel frame 321 coincides with the axis of the rotary cylinder 36.

The driving wheel 322 includes a wheel body 324 and a first rotating shaft 325. The wheel body 324 is circular with a through hole provided in the middle. The first rotating shaft 325 is cylindrical, and is coaxially arranged with the wheel body 324. The driving wheel 322 is sleeved on the first rotating shaft 325 and forms a fixed connection with the first rotating shaft 325. There may be an interference fit between the driving wheel 322 and the first rotating shaft 325. The first rotating shaft 325 is rotationally connected with the second end of the wheel frame 321. The extending direction of the first rotating shaft 325 and the extending direction of the wheel frame 321 are perpendicular to each other. In embodiments of the present disclosure, two bearings 326 are provided in the second end of the wheel frame 321, and inner rings of the two bearings 326 are sleeved on both ends of the first rotating shaft 325, respectively. Two through holes 327 are provided on inner walls at both sides of the wheel frame 321, respectively, and outer rings of the two bearings 326 are arranged in the two through holes 327, respectively, thus forming a fixed connection with the mounting through holes 373. Through such arrangement, the driving wheel 322 and the wheel frame 321 form a rotational connection therebetween. A portion of the wheel body 324 is accommodated in the wheel frame 321, and a portion protrudes out from the second end of the wheel frame 321.

The input shaft 35 has a straight bar shape, and is coaxially arranged with the rotary cylinder 36. A diameter of the input shaft 35 is smaller than that of an inner hole of the input shaft 35. The input shaft 35 penetrates through the rotary cylinder 36 and extends into the wheel frame 321 from the first end of the wheel frame 321. The input shaft 35 is capable of rotating relative to the wheel frame 321, and its rotation mode is to rotate around its own axis. In embodiments, the crawling assembly 320 further includes a bearing 351 arranged between the input shaft 35 and the rotary cylinder 36. The bearing 351 is arranged in the rotary cylinder 36, an inner ring of the bearing 351 is sleeved on the input shaft 35, and an outer ring of the bearing 351 abuts against an inner wall of the rotary cylinder 36. Two bearings 351 may be provided, which are arranged at both ends of the rotary cylinder 36, respectively. An axis of the input shaft 35 passes through the center of the driving wheel 322 and is perpendicular to the axis of the driving wheel 322.

The transmission mechanism 34 is arranged in the wheel frame 321. The transmission mechanism 34 is in transmission connection with the input shaft 35 and the driving wheel 322, respectively, and is used for transmitting a torque delivered by the input shaft 35 to the driving wheel 322, so as to drive the driving wheel 322 to roll. The transmission mechanism 34 includes a first bevel gear 341, a second rotating shaft 342 and a second bevel gear 343. The second rotating shaft 342 is parallel to the first rotating shaft 325, and is arranged at the first end of the wheel frame 321. The second bevel gear 343 is sleeved on the second rotating shaft 342 and forms a fixed connection with the second rotating shaft 342. The second rotating shaft 342 is inserted into a shaft hole in the wheel frame 321 and is in clearance fit with the shaft hole. The second rotating shaft 342 can rotate around its own axis in the shaft hole. The first bevel gear 341 is sleeved on an end of the input shaft 35 that extends into the wheel frame 321 and engages with the second bevel gear 343. An intersection angle between the two shafts is equal to 90°. The cooperation between the first bevel gear 341 and the second bevel gear 343 can change a direction of the input torque.

The second rotating shaft 342 is in transmission connection with the first rotating shaft 325. The second rotating shaft 342 and the first rotating shaft 325 may be in belt transmission, chain transmission or gear transmission. In embodiments, the gear transmission is adopted between the second rotating shaft 342 and the first rotating shaft 325, and the transmission mechanism 34 further includes a first cylindrical gear 344, a second cylindrical gear 345, a third cylindrical gear 347, and a spindle 346. The first cylindrical gear 344 is sleeved on the first rotating shaft 325 and is fixedly connected with the first rotating shaft 325. The second cylindrical gear 345 is sleeved on the second rotating shaft 342 and is fixedly connected with the second rotating shaft 342. The spindle 346 is arranged between the first rotating shaft 325 and the second rotating shaft 342 and is parallel to the first rotating shaft 325. The third cylindrical gear 347 is sleeved on the spindle 346, and is capable of rotating around an axis of the spindle 346. The spindle 346 is fixed on the inner wall of the Wheel frame 321. The third cylindrical gear 347 is in clearance fit with the spindle 346, and is capable of rotating around the spindle 346. The first cylindrical gear 344 engages with the third cylindrical gear 347, and the third cylindrical gear 347 engages with the second cylindrical gear 345.

In embodiments, after the input shaft 35 is driven by an external force to rotate around its own axis, the input shaft 35 drives the first bevel gear 341 to rotate, the first bevel gear 341 drives the second rotating shaft 342 to rotate, the second rotating shaft 342 drives the second cylinder gear 345 rotates, the second cylindrical gear 345 drives the third cylindrical gear 347 to rotate, the third cylindrical gear 347 drives the first cylindrical gear 344 to rotate, and the first cylindrical gear 344 drives the driving wheel 322 to roll, whereby the torque input from the input shaft 35 can drive the driving wheels 322 to roll.

The crawling drive assembly is used to drive the input shaft 35 to rotate, thus driving the driving wheel 322 to roll. The rotary drive assembly is used to drive the rotary cylinder 36 to rotate, thus driving the driving wheel 322 to turn.

The driving wheel 322 is mounted on the wheel frame 321, and the wheel frame 321 is mounted on the rotary cylinder 36. The rotary drive assembly drives the rotary cylinder 36 to change the traveling direction of the driving wheel 322. The axis of the input shaft 35 passes through the center of the driving Wheel 322 and is perpendicular to the axis of the driving wheel 322, and the input shaft 35 is coaxially arranged with the rotary cylinder 36. Thus, the turning of the driving wheel 322 driven by the rotary cylinder 36 and the rolling of the driving wheel 322 driven by the input shaft 35 do not interfere with each other. In addition, the input shaft 35 can extend into the cart body 31, and is driven to rotate by the crawling drive assembly arranged inside the cart body 31, so as to drive the driving wheel 322 to roll, without the need for arranging the crawling drive assembly on the wheel frame 321, which makes the overall structure of the transport cart 3 more compact.

Further, the spindle 346 is arranged between the first rotating shaft 325 and the second rotating shaft 342, and axes of the first rotating shaft 325, the second rotating shaft 342, and the spindle 346 are coplanar. In this way, the first cylindrical gear 344, the second cylindrical gear 345, and the third cylindrical gear 347 are sequentially arranged along a straight line, so that a volume of the wheel frame 321 is smaller.

Further, the middle part of the second rotating shaft 342 is rotationally connected with the wheel frame 321. The second bevel gear 343 and the second cylindrical gear 345 owe arranged at both ends of the second rotating shaft 342, respectively, and the first bevel gear 341 is located between the second bevel gear 343 and the second cylindrical gear 345. Through such arrangement, the transmission mechanism 34 may be made more compact and smaller in size, and the force on the second rotating shaft 342 is also more reasonable.

Further, the rotary cylinder 36 further includes a flange 362. The flange 362 is arranged at an end of the cylinder body 361 connected with the wheel frame 321, and extends radially outward from an end of the cylinder body 361. The flange 362 has a circular ring shape, and an outer diameter of the flange 362 is larger than an inner diameter of the mounting through hole 373. The crawling assembly 320 also includes a thrust bearing 38 coaxially arranged with the cylinder body 361. The thrust bearing 38 is sandwiched between the flange 362 and an outer wall of the mounting seat 37. In this way, the thrust bearing 38 can carry the axial load transmitted from the wheel frame 321 and prevent the stewing bearing 374 from carrying excessive axial load. Furthermore, a side of an outer edge of the flange 362 close to the mounting seat 37 is recessed inward to form an annular gap, and the thrust bearing 38 is mounted in the annular gap. In this way, the thrust bearing 38 is restricted to prevent the thrust bearing 38 from moving at will.

Figure 15:
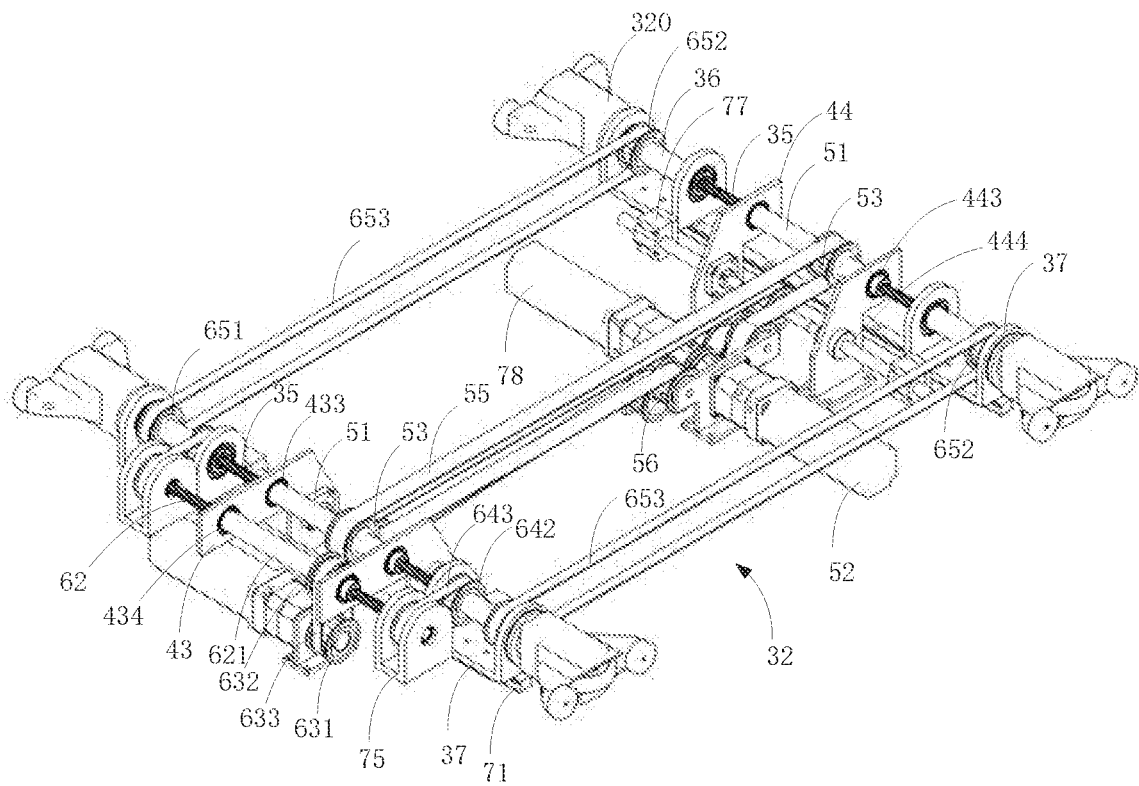
FIG. 15 is a three-dimensional schematic diagram showing a transmission device according to an exemplary embodiment.
Figure 16:
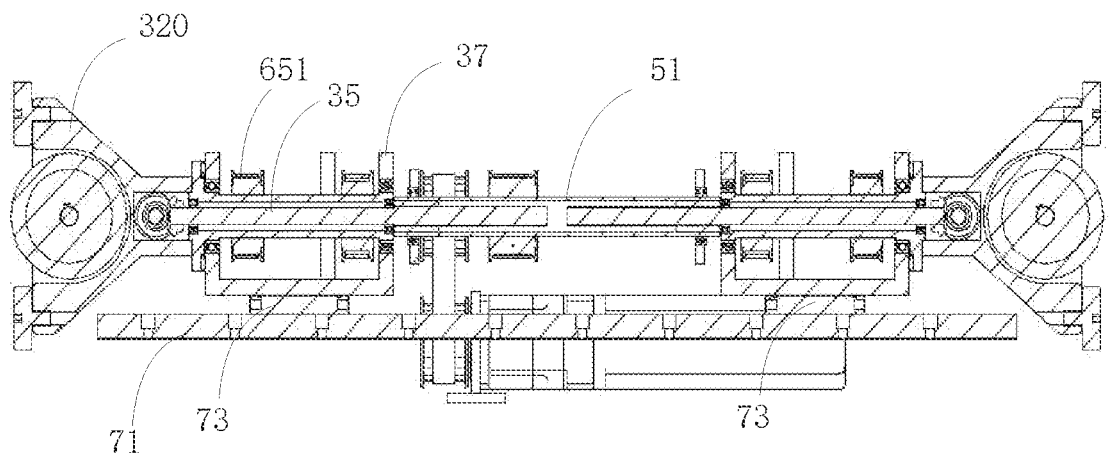
FIG. 16 is a cross-sectional view showing a transmission device taken along a first sliding rail according to an exemplary embodiment.
Figure 17:
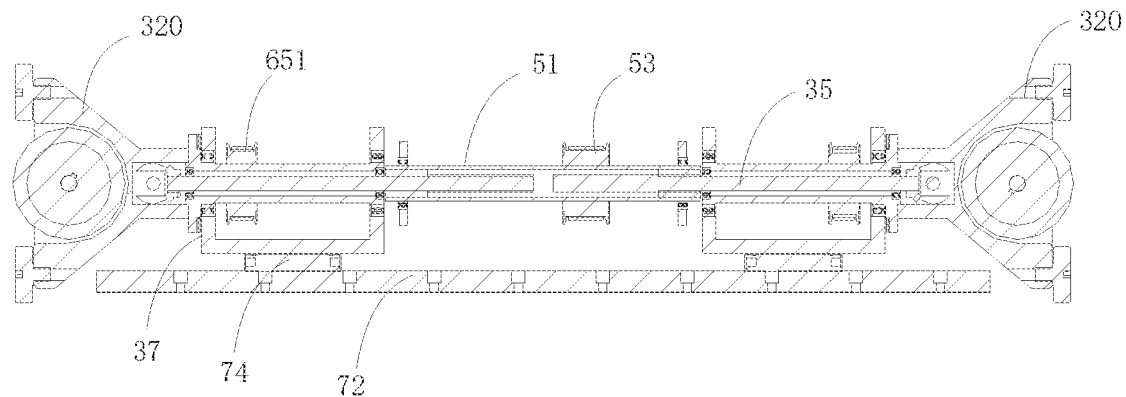
FIG. 17 is a cross-sectional view showing a transmission device taken along a second sliding rail according to an exemplary embodiment.

Further, referring to FIGS. 15-17, the transmission device 32 further includes a telescopic drive assembly. The telescopic drive assembly includes a first sliding rail 71, a second sliding rail 72, two first sliding blocks 73, two second sliding blocks 74 and a linear actuator.

The two first sliding blocks 73 are arranged on the first sliding rail 71, and the two second sliding blocks 74 are arranged on the second sliding rail 72. The first sliding block 73 can slide along the first sliding rail 71, and the second sliding block 74 can slide along the second sliding rail 72. The first sliding rail 71 is arranged at the front end 41 of the cart body 31, and the second sliding rail 72 is arranged at the rear end 42 of the cart body 31. The first sliding rail 71 and the second sliding rail 72 are both parallel to the input shaft 35. That is, they are parallel to the center axis of the wheel frame 321. The first sliding rail 71 and the second sliding rail 72 are preferably equal in length and aligned with each other. Lines connecting four end points of the first sliding rail 71 and the second sliding rail 72 can form a rectangle. The first sliding rail 71 and the second sliding rail 72 are both fixedly connected with the cart body 31, which may be screw connection, bolt connection or welding.

The mounting seats 37 of the two crawling assemblies 320 are arranged on the two first sliding blocks 73, respectively, and the mounting seats 37 of the other two crawling assemblies 320 are arranged on the two second sliding blocks 74, respectively. The bottom plates 371 of the mounting seats 37 are fixedly connected with respective sliding blocks, and the mounting seat 37 and each sliding block may be connected by screws, welding, riveting or bolting.

The first ends of the wheel frames 321 of the two crawling assemblies 320 located on the two first sliding blocks 73 respectively are arranged opposite to each other, and the first ends of the wheel frames 321 of the two crawling assemblies 320 located on the two second sliding blocks 74 respectively are arranged opposite to each other. Through such arrangement, the driving wheels 322 and the guide wheels 323 on the four crawling assemblies 320 face the two sides of the transmission device 32, respectively. In addition, the linear actuator can drive respective crawling assemblies 320 to slide along their respective sliding rails. When the linear actuator moves the crawling assemblies 320 to the middle of each sliding rail at the same time, the crawling assemblies 320 may be retracted into the cart body. At this time, the cooperation between the crawling assembly 320 and the guide rail assembly 10 may be released. In contrast, when the four crawling assemblies 320 are moved to respective ends of the first sliding rail 71 and the second sliding rail 72, respectively, the crawling assemblies 320 can extend out from the cart body, thereby cooperating again with the crawling assembly 10.

Figure 18:
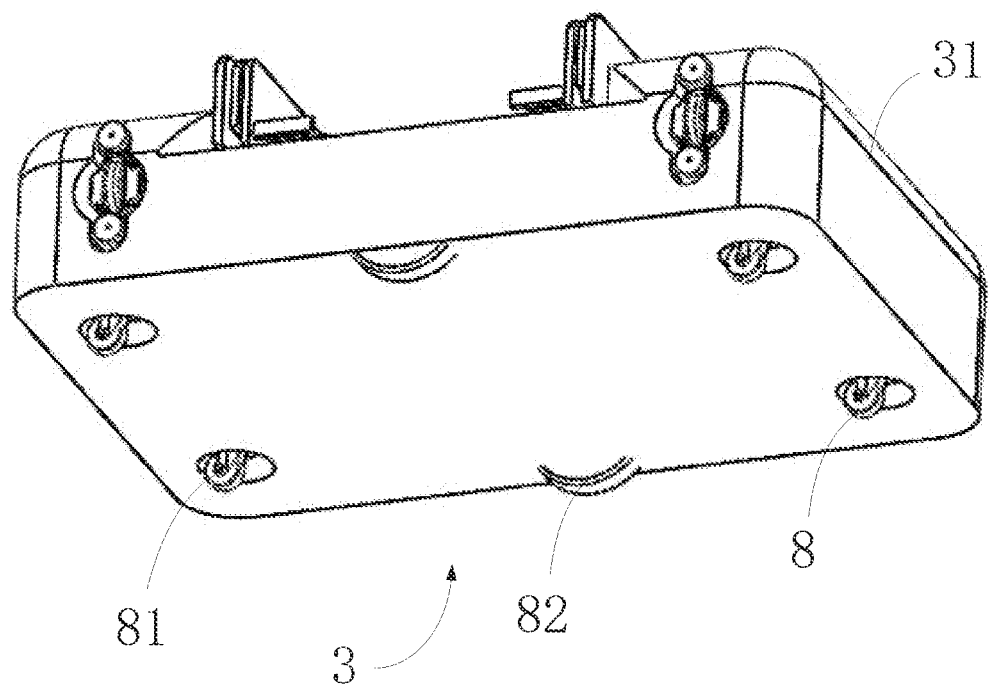
FIG. 18 is a three-dimensional schematic diagram showing a transport cart according to an exemplary embodiment.

Referring to FIG. 18, the transport cart 3 further includes a ground running mechanism 8 arranged at the bottom of the cart body 31 and having an ability of running along the ground. The ground running mechanism 8 includes multiple universal wheels 81 and two driving wheels 82. The multiple universal wheels 81 are located at two ends of the bottom of the cart body 31, respectively. There may be four universal wheels 81, which are arranged at four corners of the bottom of the cart body 31, respectively, and the universal wheels 81 support the cart body 31. The two driving wheels 82 are located on both sides of the middle part of the bottom of the cart body 31, respectively. Each driving wheel 82 rolls autonomously to drive the cart body 31 to travel along the ground. The differential driving between the two driving wheels 82 can make the transport cart turn.

Figure 19:
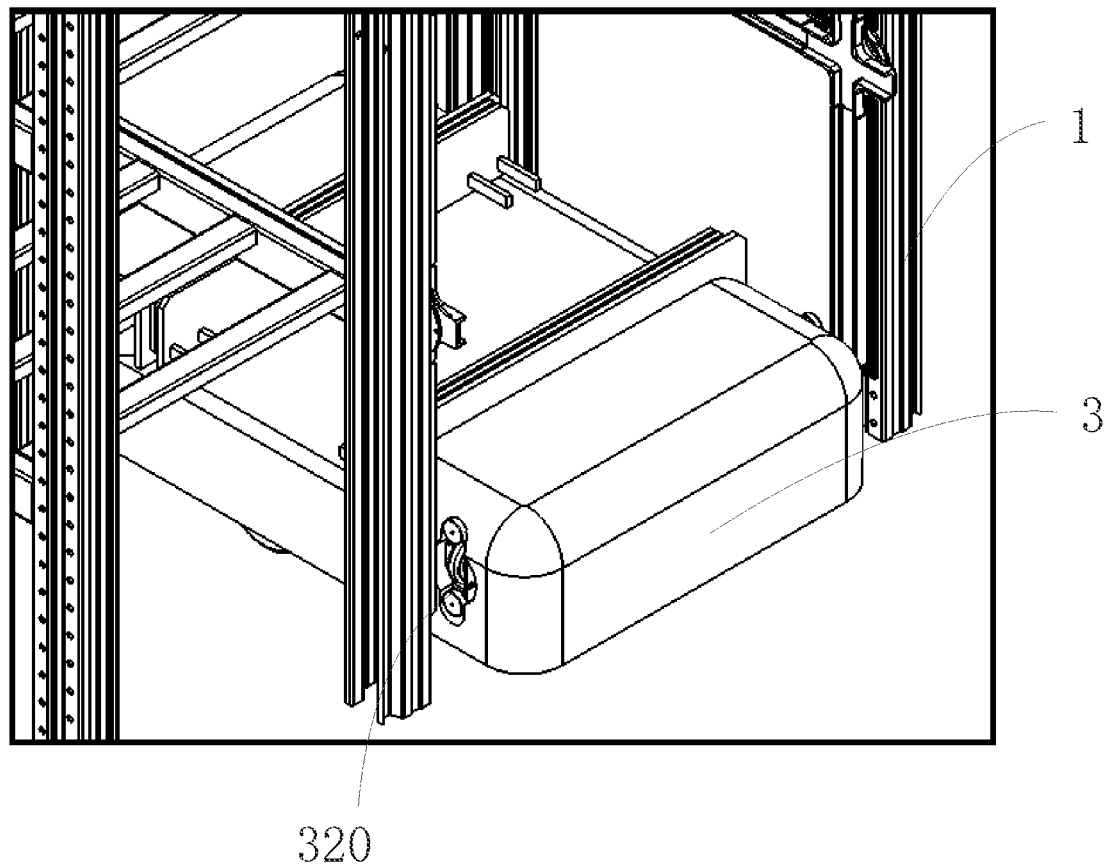
FIG. 19 is a three-dimensional schematic diagram showing a transport cart in a state of being separated from a rail assembly according to an exemplary embodiment.

Referring to FIG. 19, the second rail 14 extends to a bottom end of the shelf body 20. The transport cart 3 can carry goods from other places along the ground to the vicinity of the three-dimensional shelf 1, and then travels into the aisle between two three-dimensional shelves 1. Then the crawling assemblies 320 extend from both sides of the cart body 31 and into second rails 14 located on both sides of the transport cart 3. In this way, the transport cart 3 can crawl on the three-dimensional shelf 1 through the crawling assembly 320. The goods on the transport cart 3 may be transported to the storage bracket 21 of the shelf body 20 through a forklift assembly on the transport cart 3. Correspondingly, the forklift assembly of the transport cart 3 may also take out goods from the three-dimensional shelf 1, and then the transport cart 3 moves to the bottom of the three-dimensional shelf 1 through the crawling assembly 320, until the ground running mechanism 8 of the transport cart 3 touches the ground, and then the crawling assembly 320 is retracted into the cart body 31. Thus, the crawling assembly 320 is separated from the second rail 14 and then the goods are transported along the ground to a designated location. In this way, it is realized that the transport cart 3 can not only travel along the ground, but also travel on the three-dimensional shelf 1, thereby achieving wider adaptability and stronger functions of the transport cart 3.

Figure 14:
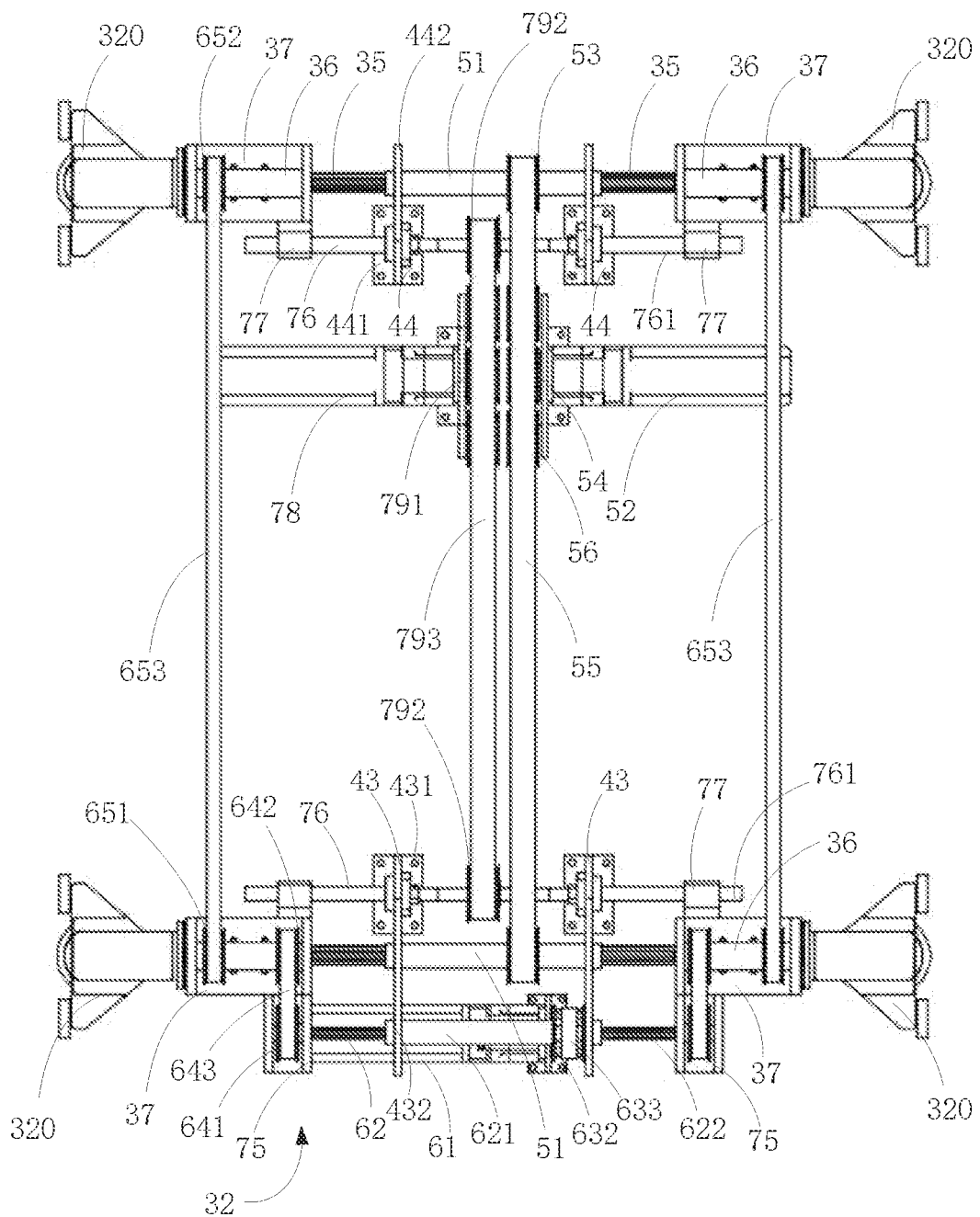
FIG. 14 is a schematic front view showing a transmission device according to an exemplary embodiment.

Further, referring to FIGS. 14 and 15, the transmission device 32 further includes two first bases 43 and two second bases 44. The first bases 43 are both fixedly connected with the front end 41 of the cart body 31 and are close to the first sliding rail 71, and the second bases 44 are both fixedly connected with the rear end 42 of the cart body 31 and are close to the second sliding rail 72. The two first bases 43 are separated from each other, and the two second bases 44 are separated from each other.

The first base 43 includes a first horizontal plate 431 and a first vertical plate 432 fixedly connected with the first horizontal plate 431. The first horizontal plate 431 is connected with the bottom of the cart body 31, and may be a screw connection or a bolt connection. The first vertical plate 432 is perpendicular to the first horizontal plate 431, and is provided with a first through hole 433, a second through hole 434, and a third through hole. Two first vertical plates 432 are arranged in parallel, and both are perpendicular to the input shaft 35. A first bearing, a second bearing and a third bearing are sequentially arranged in the first through hole 433, the second through hole 434 and the third through hole, respectively. Two first bearings are arranged coaxially, two second bearings are arranged coaxially, and two third bearings are arranged coaxially.

The second base 44 includes a second horizontal plate 441 and a second vertical plate 442 fixedly connected with the second horizontal plate 441. The second horizontal plate 441 is connected with the bottom of the cart body 31, and may be a screw connection or a bolt connection. The second vertical plate 442 is perpendicular to the second horizontal plate 441, and is provided with a fourth through hole 443 and a fifth through hole 444. Two second vertical plates 442 are arranged in parallel, and both are perpendicular to the input shaft 35. A fourth bearing and a fifth bearing are sequentially arranged in the fourth through hole 443 and the fifth through hole 444, respectively. Two fourth bearings are arranged coaxially, and two fifth bearings are arranged coaxially.

Axes of the first bearing, the second bearing, the third bearing, the fourth bearing, and the fifth bearing are all parallel to the axis of the input shaft 35. The axes of all the rotary cylinders 36 and the axes of all the input shafts 35 are parallel to each other.

The crawling drive assembly includes two connection shafts 51 and a first motor 52. The two connection shafts 51 are both straight bar shapes. One of the connection shafts 51 penetrates through the first through holes 433 of the two first bases 43, and the two first bearings are sleeved on both ends of the connection shaft 51. The other connection shaft 51 penetrates through the fourth through holes 443 of the two second bases 44, and the two fourth bearings are sleeved on both ends of the connection shaft 51, respectively. In this way, the two connection shafts 51 form a rotational connection with the first base 43 and the second base 44, respectively, and the connection shaft 51 is parallel to the input shaft 35.

The input shafts 35 of the two crawling assemblies 320 located at the front end 41 are coaxially arranged, and ends of the two ends of the connection shaft 51 located at the front end 41 of the cart body are connected with the ends of the two input shafts 35, respectively. The input shafts 35 of the two crawling assemblies 320 located at the rear end 42 are coaxially arranged, and ends of the two ends of the connection shaft 51 located at the rear end 42 of the cart body 31 are connected with the ends of the two input shafts 35, respectively. In this case, rotation of one connection shaft 51 can drive the two input shafts 35 to rotate at the same time, thereby driving the two driving wheels 322 to roll. The connection shaft 51 may be splined with the input shaft 35.

The first motor 52 is mounted on the cart body 31. A main shaft of the first motor 52 is arranged parallel to the connection shaft 51. The main shaft of the first motor 52 and the two connection shafts 51 may be in belt transmission, chain transmission or gear transmission, so that the first motor 52 can synchronously drive the four driving wheels 322 to roll.

In embodiments, the main shaft of the first motor 52 and the two connection shafts 51 are in belt transmission. Specifically, the crawling drive assembly further includes two first slave pulleys 53, a first driving pulley 54 and a first transmission belt 55. The first slave pulley 53 and the first driving pulley 54 are preferably synchronous pulleys, and the first transmission belt 55 is preferably a synchronous belt. The two first slave pulleys 53 are sleeved on the two connection shafts 51, respectively. The first slave pulleys 53 are fixedly connected with the connection shall 51. The first driving pulley 54 is sleeved on the main shaft of the driving motor and is located between the two first transmission belts 55. The first transmission belt 55 is ringlike. The first transmission belt 55 is hooped on the two first slave pulleys 53 and abuts against the first driving pulley 54 tightly, so that the belt transmission is formed between the first motor 52 and the connection shaft 51.

Furthermore, the crawling drive assembly further includes two first tensioning wheels 56. The two first tensioning wheels 56 are arranged on both sides of the first driving pulley 54 and tighten an outer side of the first transmission belt 55, so as to increase a contact area between the first driving pulley 54 and the first transmission belt 55, thus avoiding slip between the first driving pulley 54 and the first transmission belt 55.

Figure 20:
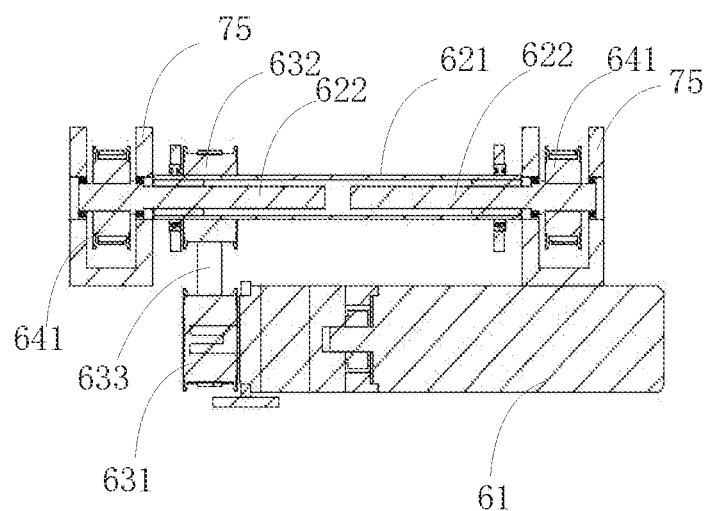
FIG. 20 is a partial cross-sectional view showing a rotary drive assembly according to an exemplary embodiment.

Further, referring to FIG. 20, the rotary drive assembly includes a second motor 61 and a transmission shaft 62. The transmission shaft 62 is arranged at the front end 41 of the cart body 31, and an axis of the transmission shaft 62 is parallel to the axis of the rotary cylinder 36. The transmission shaft 62 includes a first sub-shaft 621 and two second sub-shafts 622. The two second sub-shafts 622 are arranged at both ends of the first sub-shaft 621, respectively, and are arranged coaxially with the first sub-shaft 621. One end of each of the two second sub-shafts 622 is connected with a respective end of the first Sub-shaft 621.

The first sub-shaft 621 penetrates through the second through holes 434 of the two first bases 43, and the two second bearings are sleeved on both ends of the first sub-shaft 621, respectively. In this way, the transmission shaft 62 is rotationally connected with the cart body 31, and the transmission shaft 62 can rotate around its own axis.

The second motor 61 is fixed at the bottom of the cart body 31, and is preferably arranged below the first sub-shaft 621. A main shaft of the second motor 61 and the first sub-shaft 621 are parallel to each other, and the main shaft of the second motor 61 and the first sub-shaft 621 are in transmission connection with each other. The main shaft of the second motor 61 and the first sub-shaft 621 may be in gear transmission, belt transmission or chain transmission. In embodiments, the second motor 61 and the first sub-shaft 621 are in belt transmission. Specifically, the rotary drive assembly further includes a second driving pulley 631, a second slave pulley 632, and a second transmission belt 633. The second slave pulley 632 and the second driving pulley 631 are preferably synchronous pulleys, and the second transmission belt 633 is preferably a synchronous belt. The second driving pulley 631 is sleeved on the main shall of the second motor 61. The second slave pulley 632 is sleeved on the first sub-shaft 621. The second transmission belt 633 is ringlike. The second transmission belt 633 is hooped on the second driving pulley 631 and the second slave pulley 632, so that the belt transmission is formed between the first sub-shaft 621 and the main shaft of the second motor 61.

The two second sub-shafts 622 may be in transmission connection with the rotary cylinders 36 of the two crawling assemblies 320 on the first sliding rail 71, respectively, and the rotation of the first sub-shaft 621 can drive the rotary cylinder 36 to rotate. For example, the second sub-shaft 622 and the rotary cylinder 36 may be in gear transmission, belt transmission or chain transmission. In embodiments, the second sub-shaft 622 and the rotary cylinder 36 are in belt transmission. The rotary drive assembly further includes a third driving pulley 641, a third slave pulley 642 and a third transmission belt 643. The third slave pulley 642 and the third driving pulley 641 are preferably synchronous pulleys, and the third transmission belt 643 is preferably a synchronous belt. The third driving pulley 641 is sleeved on the second sub-shall 622. The third slave pulley 642 is sleeved on the rotary cylinder 36. The third transmission belt 643 is ringlike. The third transmission belt 643 is hooped on the third driving pulley 641 and the third slave pulley 642, so that the belt transmission is formed between the second sub-shaft 622 and the rotary cylinder 36.

The two rotary cylinders 36 on one side of the cart body 31 are in transmission connection, and the two rotary cylinders 36 on the other side of the cart body 31 are in transmission connection. The two rotary cylinders 36 may be in belt transmission, rack and pinion transmission or chain transmission. In embodiments, the two rotary cylinders 36 are in belt transmission. The rotary drive assembly further includes two fourth driving pulleys 651, two fourth slave pulleys 652, and two fourth transmission belts 653. The fourth slave pulley 652 and the fourth driving pulley 651 are preferably synchronous pulleys, and the fourth transmission belt 653 is preferably a synchronous belt. The two fourth driving pulleys 651 are sleeved on the two rotary cylinders 36 located at the front end 41 of the cart body 31, respectively. The two fourth slave pulleys 652 are sleeved on the two rotary cylinders 36 located at the rear end 42 of the cart body 31, respectively. The two fourth transmission belts 653 are both ringlike. One fourth transmission belt 653 is hooped on one fourth driving pulley 651 and one fourth slave pulley 652 on one side of the cart body 31, and the other fourth transmission belt 653 is hooped on one fourth driving pulley 651 and one fourth slave pulley 652 on the other side of the cart body 31.

In this way, the rotation of the main shaft of the second motor 61 can drive the transmission shaft 62 to rotate, and the rotation of the transmission shaft 62 drives the two rotary cylinders 36 located at the front end 41 of the car body 31 to rotate. Then, the rotation of the two rotary cylinders 36 can drive the other two rotary cylinders 36 to rotate, so that the second motor 61 can synchronously drive the four driving wheels 322 to turn. In embodiments, axes of the four driving wheels 322 are parallel to each other.

Furthermore, the telescopic drive assembly further includes two support seats 75 fixedly connected with the two mounting seats 37 at the front end 41, respectively. The two support seats 75 are also rotationally connected with the second sub-shafts 622 respectively. In embodiments, a sixth bearing is mounted on the support seat 75, and the sixth bearing is sleeved on the second sub-shaft 622.

The first sub-shaft 621 is splined with the second sub-shaft 622, and torque may be transmitted between the first sub-shaft 621 and the second sub-shaft 622. The second sub-shaft 622 can slide axially with respect to the first sub-shaft 621. In embodiments, the first sub-shaft 621 is a spline tube, and the second sub-shaft 622 is a spline shaft. It should be understood that the first sub-shaft 621 may also be configured as the spline shaft, and the second sub-axis 622 may also be configured as the spline tube.

The connection shaft 51 is splined with the input shaft 35, and torque may be transmitted between the connection shaft 51 and the input shaft 35. The input shaft 35 can slide axially with respect to the connection shaft 51. In embodiments, the connection shaft 51 is the spline tube, and the input shaft 35 is the spline shaft. It should be understood that the connection shaft 51 may also be configured as the spline shaft, and the input shaft 35 may also be configured as the spline tube.

Figure 21:
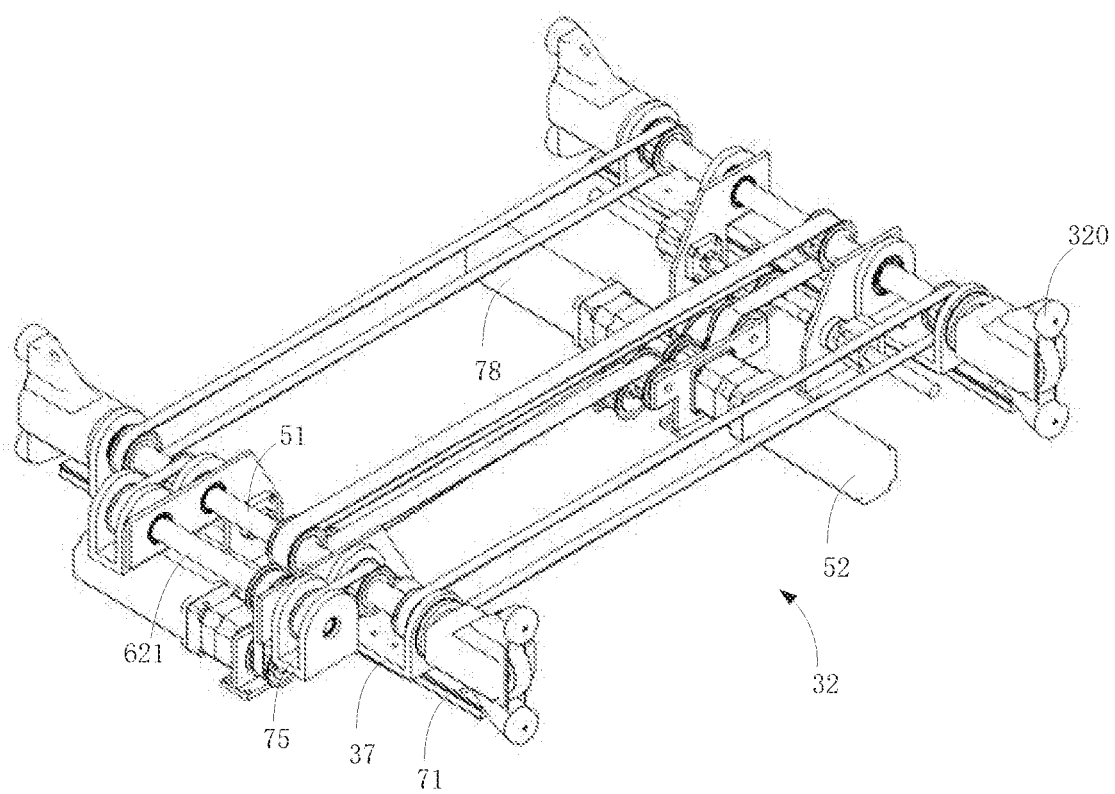
FIG. 21 is a three-dimensional schematic diagram showing a transmission device when the crawling assembly is in a retracted state according to an exemplary embodiment.

Referring to FIGS. 15 and 21, the linear actuator is used to drive the mounting seat 37 to slide relative to the cart body 31. When the linear actuator drives the mounting seat 37 and slides towards the car body 31 at the same time, the crawling assembly 320 can leave the guide rail assembly and retract into the car body 31. The linear actuator drives the mounting seat 37 to slide outside the car body 31 at the same time, and the crawling assembly 320 may be engaged with the guide rail assembly. When the crawling assembly 320 expands and contracts, the second sub-shaft 622 follows and slides relative to the first sub-axis 621, and the transmission shaft 62 follows and slides relative to the connection shaft 51. Thus, the crawling drive assembly and the rotary drive assembly can still maintain normal operation.

In embodiments, the linear actuator includes two screw rods 76, four screw nuts 77 and a third motor 78. Both ends of the screw rod 76 are provided with two external thread segments 761 with opposite rotation directions. One screw rod 76 penetrates through the third through holes of the two first bases 43, and the two third bearings 761 are sleeved on the screw rod 76. The other screw rod 76 penetrates through the fifth through holes 444 of the two second bases 44, and the two fifth bearings are sleeved on the screw rod 76. In this way, the two screw rods 76 both form rotational connections with the cart body 31, and are located at the front end 41 and the rear end 42 of the cart body 31, respectively.

The two screw nuts 77 are sleeved on the two external thread segments 761 of the screw rod 76 at the front end 41, respectively, and the other two screw nuts 77 are sleeved on the two external thread segments 761 of the screw rod 76 at the rear end 42, respectively. The four screw nuts 77 are also fixedly connected with the four mounting seats 37 respectively.

The main shaft of the third motor 78 is in transmission connection with the two screw rods 76, and the third motor 78 can drive the two screw rods 76 to rotate synchronously. When the third motor 78 drives the two screw rods 76 to rotate, the screw rods 76 drive the screw nuts 77 to slide along the screw rods 76, and the screw nuts 77 drive the mounting seat 37 to slide.

Further, the main shaft of the third motor 78 and the two screw rods 76 are in belt transmission. The telescopic drive assembly further includes a fifth driving pulley 791, two fifth slave pulleys 792, and a fifth transmission belt 793. The fifth slave pulley 792 and the fifth master pulley 791 are preferably synchronous pulleys, and the fifth transmission belt 793 is preferably a synchronous belt. The fifth driving pulley 791 is sleeved on the main shaft of the third motor 78. The two fifth slave pulleys 792 are sleeved on the two screw rods 76, respectively. The fifth driving pulley 791 is located between the two fifth slave pulleys 792. The fifth transmission belt 793 is ringlike. The fifth transmission belt 793 is hooped on the two fifth slave pulleys 792, and abuts against the fifth driving pulley 791.

Although the present disclosure has been disclosed with reference to certain embodiments, various variations and modifications may be made to the described embodiments without departing from the scope of the present disclosure. Therefore, it should be understood that the present disclosure is not limited to the illustrated embodiments, and its protection scope should be defined by the content of the appended claims and their equivalent structures and solutions.

What is claimed is:

1. A transmission device for a transport cart, comprising: a crawling assembly (320), a rotary drive assembly, and a crawling drive assembly, wherein
   the crawling assembly (320) comprises:
   a wheel frame (321), comprising a first end and a second end opposite to the first end, the wheel frame (321) extending from the first end to the second end;
   a driving wheel (322), mounted at the second end and having an axis perpendicular to an extending direction of the wheel frame (321); and
   a guide wheel (323), mounted at the second end and having an axis parallel to the extending direction of the wheel frame (321),
   wherein, the rotary drive assembly is configured to drive the wheel frame (321) to rotate around a central axis of the extending direction of the wheel frame (321), and the crawling drive assembly is configured to drive the driving wheel (322) to roll.

2. The transmission device according to claim 1, wherein four crawling assemblies (320) are provided, and the transmission device further comprises a telescopic drive assembly, and
the telescopic drive assembly comprises:
a first sliding rail (71) parallel to the central axis, the first sliding rail being slidably connected with two of the four crawling assemblies (320);
a second sliding rail (72) parallel to the first sliding rail (71) and separated from the first sliding rail (71), the second sliding rail (72) being slidably connected with the other two of the four crawling assemblies (320); and
a linear actuator, configured to drive each crawling assembly (320) to slide along a respective sliding rail where it is located,
wherein, the first ends of the wheel frames (321) of two crawling assemblies (320) located on a same sliding rail are arranged opposite to each other.

3. The transmission device according to claim 2, wherein each crawling assembly (320) further comprises:
a mounting seat (37) slidably connected with the sliding rail;
a rotary cylinder (36) rotationally connected with the mounting seat (37), wherein the rotary cylinder (36) is rotatable around an axis thereof;
a transmission mechanism (34) arranged within the wheel frame (321), wherein the transmission mechanism (34) is in transmission connection with the driving wheel (322); and
an input shaft (35) penetrating through the rotary cylinder (36), extending into the wheel frame (321) from the first end and being in transmission connection with the transmission mechanism (34), wherein axes of the input shaft (35) and the rotary cylinder (36) both coincide with the central axis,
wherein, the crawling drive assembly drives the driving wheel (322) to roll by driving the input shaft (35) to rotate, and the rotary drive assembly drives the wheel frame (321) to rotate by driving the rotary cylinder (36) to rotate.

4. The transmission device according to claim 3, wherein the input shafts (35) of two crawling assemblies (320) located on the first sliding rail (71) are arranged coaxially, and the input shafts (35) of two crawling assemblies (320) located on the second sliding rail (72) are arranged coaxially;
the crawling drive assembly comprises two connection shafts (51) parallel to the input shafts (35) and close to the first sliding rail (71) and the second sliding rail (72) respectively, and a first motor (52) for driving the two connection shafts (51) to rotate; and
two ends of each connection shaft (51) are splined to a set of two input shafts (35) arranged coaxially, respectively, and the connection shaft (51) and the input shaft (35) are slideable axially with respect to one another.

5. The transmission device according to claim 4, wherein the first motor (52) is in belt transmission, chain transmission, or gear transmission with the two connection shafts (51), respectively.

6. The transmission device according to claim 4, wherein the rotary drive assembly comprises a transmission shaft (62) parallel to the connection shaft (51) and rotatable about its own axis, and a second motor (61) for driving the transmission shaft (62) to rotate; and
two ends of the transmission shaft (62) are in transmission connection with the rotary cylinders (36) of two crawling assemblies (320) located on the first sliding rail (71), respectively, and every two rotary cylinders (36) located on a same side are in transmission connection.

7. The transmission device according to claim 6, wherein the rotary cylinders (36) are in belt transmission, gear transmission, or chain transmission, the transmission shaft (62) is in belt transmission, chain transmission, or gear transmission with the rotary cylinders (36), and a main shaft of the second motor (61) is in belt transmission, chain transmission, or gear transmission with the transmission shaft (62).

8. The transmission device according to claim 6, wherein the connection shaft (51) is splined with the input shaft (35), the input shaft (35) is slideable axially with respect to the connection shaft (51), and one of the connection shaft (51) and the input shaft (35) is a spline shaft, while the other is a spline tube;
the transmission shaft (62) comprises a first sub-shaft (621) parallel to the input shaft (51) and rotatable around its own axis, and two second sub-shafts (622) arranged at two ends of the first sub-shaft (621) and coaxially arranged with the first sub-shaft (621), respectively,
the first sub-shaft (621) is splined with the second sub-shafts (622), the second sub-shafts (622) are slideable axially with respect to the first sub-shaft (621), and one of the first sub-shaft (621) and the second sub-shaft (622) is the spline shaft, while the other is the spline tube;
the two second sub-shafts (622) are in transmission connection with the rotary cylinders (36) of two crawling assemblies (320) located on the first sliding rail (71), respectively; and
the telescopic drive assembly further comprises two support seats (75), the two support seats (75) are fixedly connected with the mounting seats (37) of two crawling assemblies (320) located on the first sliding rail (71), respectively, and the two support seats (75) are further rotationally connected with the two second sub-shafts (622), respectively.

9. The transmission device according to claim 8, wherein the linear actuator comprises:
two screw rods (76) parallel to the central axis and rotatable around their own axis, wherein two ends of each screw rod (76) are provided with two external thread segments (761) with opposite rotation directions;
four screw nuts (77) sleeved on the four external thread segments (761), respectively; and
a third motor (78) for driving the two screw rods (76) to rotate;
wherein, the two screw rods (76) are arranged close to the first sliding rail (71) and the second sliding rail (72), respectively, and the four screw nuts (77) are fixedly connected with four mounting seats (37), respectively.

10. The transmission device according to claim 9, wherein a main shaft of the third motor (78) is in belt transmission, chain transmission, or gear transmission with the two screw rods (77), respectively.

11. The transmission device according to claim 9, wherein the transmission device (32) further comprises a first base (43) and a second base (44), both of which are configured to be fixedly connected with a cart body of the transport cart;
the first base (43) and the second base (44) are close to the first sliding rail (71) and the second sliding rail (72), respectively; and the first base (43) is rotationally connected with the connection shaft (51), the screw rod (76), and the first sub-shaft (621) that are close to the first sliding rail (71), and the second base (44) is rotationally connected with the connection shaft (51) and the screw rod (76) that are close to the second sliding rail (72).

12. The transmission device according to claim 11, wherein two first bases (43) and two second bases (44) are provided, the two first bases (43) are separated from each other, and the two second bases (44) are separated from each other.

13. The transmission device according to claim 3, wherein
the driving wheel (322) is provided with a first rotating shaft (325), and the first rotating shaft (325) is rotationally connected with the wheel frame (321); and
the transmission mechanism (34) comprises:
a first bevel gear (341) sleeved on the input shaft (35);
a second rotating shaft (342) rotationally connected with the wheel frame (321) and parallel to the first rotating shaft (325); and
a second bevel gear (343) sleeved on the second rotating shaft (342) and engaging with the first bevel gear (341);
wherein, the second rotating shaft (342) is in transmission connection with the first rotating shaft (325).

14. The transmission device according to claim 13, wherein the transmission mechanism (34) further comprises:
a first cylindrical gear (344) sleeved on the first rotating shaft (325);
a second cylindrical gear (345) sleeved on the second rotating shaft (342);
a spindle (346) mounted on the wheel frame (321) and parallel to the first rotating shaft (325); and
a third cylindrical gear (347) sleeved on the spindle (346) and rotatable around the spindle (346), wherein the third cylindrical gear (347) engages with the first cylindrical gear (344) and the second cylindrical gear (345), respectively.

15. The transmission device according to claim 14, wherein a middle part of the second rotating shaft (342) is rotationally connected with the wheel frame (321), the second bevel gear (343) and the second cylindrical gear (345) are arranged at two ends of the second rotating shaft (342), respectively, and the first bevel gear (341) is located between the second bevel gear (343) and the second cylindrical gear (345).

16. The transmission device according to claim 3, wherein each crawling assembly (320) further comprises a bearing (351), an outer ring of the bearing (351) abuts against an inner wall of the rotary cylinder (36), and an inner ring of the bearing (351) is sleeved on the input shaft (35).

17. The transmission device according to claim 3, wherein the telescopic drive assembly further comprises:
two first sliding blocks (73), both of which are arranged on the first sliding rail (71); and
two second sliding blocks (74), both of which are arranged on the second sliding rail (72),
wherein, the four mounting seats are arranged on the two first sliding blocks (73) and the two second sliding blocks (74), respectively.

18. The transmission device according to claim 3, wherein the driving wheel (322) is a flat wheel, a synchronous wheel, a gear, or a sprocket.

19. The transmission device according to claim 1, wherein the central axis passes through a center of the driving wheel (322), two guide wheels (323) are provided, and the two guide wheels (323) are arranged on opposite sides of the driving wheel (322) respectively and have equal distances from the central axis.

20. A transport cart, comprising a transmission device, wherein
the transmission device comprises: a crawling assembly (320), a rotary drive assembly, and a crawling drive assembly, wherein
the crawling assembly (320) comprises:
a wheel frame (321), comprising a first end and a second end opposite to the first end, the wheel frame (321) extending from the first end to the second end;
a driving wheel (322), mounted at the second end and having an axis perpendicular to an extending direction of the wheel frame (321); and
a guide wheel (323), mounted at the second end and having an axis parallel to the extending direction of the wheel frame (321),
wherein, the rotary drive assembly is configured to drive the wheel frame (321) to rotate around a central axis of the extending direction of the wheel frame (321), and the crawling drive assembly is configured to drive the driving wheel (322) to roll.

\* \* \* \* \*